(12) United States Patent
Campbell et al.

(10) Patent No.: US 12,123,476 B2
(45) Date of Patent: Oct. 22, 2024

(54) INVERTED INJECTION METHOD OF AFFIXING A TERMINATION TO A TENSILE MEMBER

(71) Applicants: Richard V. Campbell, Havana, FL (US); David M. Gladwin, Havana, FL (US)

(72) Inventors: Richard V. Campbell, Havana, FL (US); David M. Gladwin, Havana, FL (US)

( * ) Notice: Subject to any disclaimer, the term of this patent is extended or adjusted under 35 U.S.C. 154(b) by 955 days.

(21) Appl. No.: 17/074,879

(22) Filed: Oct. 20, 2020

(65) Prior Publication Data
US 2021/0033170 A1    Feb. 4, 2021

Related U.S. Application Data

(63) Continuation-in-part of application No. 15/710,962, filed on Sep. 21, 2017, now Pat. No. 10,808,799.

(60) Provisional application No. 62/398,716, filed on Sep. 23, 2016.

(51) Int. Cl.
| | |
|---|---|
| *F16G 11/04* | (2006.01) |
| *B29C 45/14* | (2006.01) |
| *B29C 70/84* | (2006.01) |
| *B29C 70/88* | (2006.01) |
| *D07B 1/00* | (2006.01) |
| *D07B 9/00* | (2006.01) |

(52) U.S. Cl.
CPC ........ *F16G 11/04* (2013.01); *B29C 45/14385* (2013.01); *B29C 45/14426* (2013.01); *B29C 70/84* (2013.01); *B29C 70/88* (2013.01); *D07B 1/005* (2013.01); *F16G 11/042* (2013.01); *D07B 9/00* (2013.01)

(58) Field of Classification Search
CPC ...... F16G 11/025; F16G 11/04; F16G 11/042; D07B 9/00; E04C 5/12; E04C 5/122; E01D 19/14; E01D 19/16; B29C 45/14; B29C 65/00; B32B 37/00; Y10T 403/473; Y10T 403/475
See application file for complete search history.

(56) References Cited

U.S. PATENT DOCUMENTS

| | | | | |
|---|---|---|---|---|
| 1,293,383 A | * | 2/1919 | Eaton | F16G 11/12 403/43 |
| 2,803,486 A | * | 8/1957 | Larson | B66C 1/34 294/82.11 |

(Continued)

FOREIGN PATENT DOCUMENTS

| | | | | |
|---|---|---|---|---|
| DE | 102015213036 A1 | * | 1/2017 | |
| EP | 2687751 A2 | * | 1/2014 | ............ F16G 11/042 |

*Primary Examiner* — Jonathan P Masinick
(74) *Attorney, Agent, or Firm* — J. Wiley Horton

(57) ABSTRACT

A method for attaching an anchor to an end of a tensile member by inverting the assembly of anchor and tensile member and injecting pressurized potting compound. A length of filaments of the tensile member are placed within a cavity through the anchor. The anchor and filaments are placed in an inverted position, with the distal end of the anchor facing downward and the cable extending upward out of the anchor. If the anchor has an open distal end this is sealed. Liquid potting compound is injected into the anchor cavity and allowed to solidify. During the solidification process, a controlled translation (pulling) of the cable is preferably introduced.

20 Claims, 28 Drawing Sheets

(56) References Cited

U.S. PATENT DOCUMENTS

| | | | | |
|---|---|---|---|---|
| 3,264,017 | A * | 8/1966 | Lagarde | F16G 11/042 24/265 EE |
| 3,409,951 | A * | 11/1968 | Morieras | F16G 11/04 403/275 |
| 3,507,949 | A * | 4/1970 | Campbell | F16G 11/042 403/267 |
| 3,551,960 | A * | 1/1971 | Little | F16G 11/05 174/79 |
| 3,739,457 | A * | 6/1973 | Davis | B29C 66/5344 403/275 |
| 4,317,640 | A * | 3/1982 | Peeling | F16G 11/042 403/268 |
| 4,459,722 | A * | 7/1984 | Dziedzic | F16G 11/02 24/136 L |
| 4,491,555 | A * | 1/1985 | Cork | C08G 18/16 264/261 |
| 5,525,003 | A * | 6/1996 | Williams | F16G 11/042 428/377 |
| 6,036,281 | A * | 3/2000 | Campbell | B60B 5/02 301/58 |
| 7,076,853 | B2 * | 7/2006 | Campbell | F16G 11/042 29/458 |
| 8,048,357 | B2 * | 11/2011 | Barefield | B29C 67/246 264/102 |
| 8,181,437 | B2 * | 5/2012 | Glennie | F16G 11/042 57/22 |
| 8,371,015 | B2 * | 2/2013 | Campbell | F16G 11/048 29/863 |
| 2007/0108656 | A1 * | 5/2007 | Barefield | B29C 70/76 264/261 |
| 2010/0307674 | A1 * | 12/2010 | MacKay | F16G 11/048 156/267 |
| 2016/0221258 | A1 * | 8/2016 | Campbell | B29C 65/7841 |
| 2016/0362939 | A1 * | 12/2016 | Sjostedt | E21B 17/0426 |
| 2018/0051522 | A1 * | 2/2018 | Sjostedt | E21B 17/042 |

* cited by examiner

INVERTED INJECTION METHOD OF AFFIXING A TERMINATION TO A TENSILE MEMBER

CROSS-REFERENCES TO RELATED APPLICATIONS

This non-provisional patent application is a continuation of U.S. patent application Ser. No. 15/710,962. The parent application was filed on Sep. 21, 2017 and listed the same inventors.

STATEMENT REGARDING FEDERALLY SPONSORED RESEARCH OR DEVELOPMENT

Not Applicable.

MICROFICHE APPENDIX

Not Applicable

BACKGROUND OF THE INVENTION

1. Field of the Invention

This invention relates to the field of tensile strength members. More specifically, the invention comprises a method for affixing a termination to an end of a tensile strength member such as a cable.

2. Description of the Related Art

Tensile strength members must generally be connected to other components in order to be useful. A flexible cable provides a good example. The cable must generally include some type of end-fitting so that it can transmit a load. For example, a cable used in a hoist generally includes a lifting hook on its free end. This lifting hook may be rigged to a load. The assembly of an end-fitting and the portion of the cable to which it is attached is generally called a "termination."

Most high-strength cables are presently made of steel. The cable is a wound or braided assembly of individual steel wire. An end fitting (such as a lifting hook) is often attached to the steel cable by placing a length of the cable within a cavity running through a portion of the end fitting. The wires within the end fitting are splayed apart and a potting compound is then used to lock the wires within the fitting. The term "potting compound" means any substance which transitions from a liquid to a solid over time. Examples include molten lead, thermoplastics, and UV-cure or thermoset resins (such as two-part polyesters or epoxies). Other examples include plasters, ceramics, and cements. The term "solid" is by no means limited to an ordered crystalline structure such as found in most metals. In the context of this invention, the term "solid" means a state in which the material does not flow significantly under the influence of gravity. Thus, a soft but stable wax is yet another example of such a solid.

Molten lead was traditionally used as a potting compound for steel cables. Once the individual wires were splayed within the expanding cavity of an end-fitting, molten lead was poured into the cavity. The lead then solidified and locked a portion of the cable in the cavity. In more recent years lead has been replaced by high-strength epoxies.

Modern cables may still be made of steel, but synthetic filaments are becoming more common. These include DYNEEMA, SPECTRA, TECHNORA, TWARON, KEVLAR, VECTRAN, PBO, carbon fiber, and glass fiber (among many others). In general the individual filaments have a thickness that is less than that of human hair. The filaments are very strong in tension, but they are not very rigid. They also tend to have low surface friction. These facts make such synthetic filaments difficult to handle during the process of adding a termination and difficult to organize.

Hybrid cable designs are also emerging in which traditional materials are combined with high-strength synthetic materials. These present additional challenges, since the metal portions may be quite stiff while the synthetic portions will not be. FIG. 6 provides an illustration of one type of hybrid cable in which a "core" of synthetic filaments 35 are wrapped by a layer of metal filaments 33.

FIGS. 1-4 illustrate a common prior art process for creating a termination on an end of a synthetic cable. The end fitting in this example is anchor 18. Anchor 18 is shown sectioned in half so that the reader may see the expanding shape of internal cavity 20. The cavity expands from the throat region (where it is smallest) to the distal portion of the anchor (where it is largest). In this design, a length of cable 10 is secured within this cavity. Binder 21 is typically applied to cable 10 before it is cut. The binder may be anything that holds the cable filaments in alignment, including a simple tape wrapping. The presence of the binder allows the cable to pass easily through the anchor's cavity.

FIG. 2 shows the assembly after the cable has been passed through the anchor. At least a portion of the binder is removed at this point so that the filaments may be splayed apart into splayed filaments 12. FIG. 3 shows the cable properly positioned for the potting process. A portion of binder 21 may be left in position to help seal the "throat" region of the anchor.

Liquid potting compound is then introduced by some means. In FIG. 4, a dispensing device is used to introduce liquid potting compound 15 into the anchor's distal end 56. The components are then held in position until the potting compound solidifies. As is known to those skilled in the art, an extended length of time may be needed for the potting compound to reach full strength. This is particularly true for cross-linking adhesives, where extended cure times of up to 24 hours are known.

The liquid potting compound may be introduced in stages such as by "painting" it onto the exposed strands and then pouring it into the distal end 56 of the anchor. It is also known to use an injection needle thrust into the exposed portion of the filaments proximate distal end 56.

The anchor shown in the illustrations includes an external (male) thread. This may be used to attach other useful portions of a complete termination. For example, FIG. 5 shows the addition of loading eye 27. Loading eye 27 is connected to anchor 18 via threaded engagement 29. The reader will observe that a portion of the cable is locked within potted region 14. Unpotted filaments 36 remain freely flexing.

Like the prior illustrations, FIG. 5 shows a termination where the connection between the filaments and the anchor is made entirely by potting. There are other known constructions where the connection is made by a combination of potting and mechanical friction. For example, loading eye 27 might include an inverted cone that protrudes downward into the cavity within the anchor to force the strands outward toward the cavity wall—thereby introducing a frictional engagement. Such a construction is often called a "hybrid" termination—meaning that it relies on both the potting approach and the creation of mechanical friction to lock the strands to the anchor. The present invention is applicable to hybrid designs as well, although the use of a hybrid termination has not been illustrated.

Those skilled in the art will know that cables made from synthetic filaments have a wide variety of constructions. The example shown in FIGS. 1-4 has a parallel core of filaments surrounded by a jacket of braided filaments. In other cases the cable may be braided throughout. In still other examples the cable construction may be: (1) an entirely parallel construction enclosed in a jacket made of different material, (2) a helical "twist" construction, (3) a more complex construction of multiple helices, multiple braids, or some combination of helices and braids, or (4) a hybrid construction including metallic constituents.

Throughout this disclosure cables will be used as an example of a tensile strength member. However the invention should not be viewed as being limited to cables. The term "tensile strength member" or "tensile member" encompasses cables and sub-components of cables such as strands. The reader is referred to commonly-owned U.S. Pat. No. 8,371,015 for more detailed descriptions regarding the application of an attachment to a sub-component of a larger cable. The invention also encompasses non-cable structures intended to carry loads in tension. The invention is also applicable to tension members carrying additional elements such as electrical conductors or fiber optic elements.

Likewise, the term "anchor" should be viewed broadly to encompass virtually anything that can be attached to a cable. The anchor would ordinarily include some features facilitating attachment—such as a hook, a shoulder, or threads. These features are conventional and have not been illustrated in many of the drawing views. Anchor 18 is instead depicted as a simple cylinder with a cavity 20 passing along its central axis.

In the example of FIG. 1, the reader will note that cavity 20 expands as one proceeds from the portion of the anchor facing the length of cable (the "proximal" end, which is the bottom end in the orientation of the view) toward the portion of the anchor facing in the opposite direction (the "distal" end, which is the top end in the orientation of the view). The expanding cavity in this example is a linear taper between two straight portions—all joined by fillets. Differing wall profiles may be used to create a wide variety of expanding cavities.

Of course, if enough tension is applied the termination will fail. Ideally failure would occur at 100% of the breaking stress of each individual termination. This would be a 100% efficient termination in which the termination hardware and method of termination did not detract from the performance potentially available in the filament material itself. In reality terminations fail below 100% of the filament strength and in some cases they fail far below it. FIG. 18 depicts a sectional view in which anchor 18 has been sectioned to reveal the potted region lying within the cavity in the anchor's interior (The assembly is shown inverted in FIG. 18). The cavity is defined by cavity wall 22—which is a profile revolved around a central axis. It is not essential that the cavity be radially symmetric but most such cavities are radially symmetric. Proximal end 54 is the end of the anchor where the cable emerges. Distal end 56 is the opposite end.

The solid "plug" in potted region 14 (a composite of cable filaments and solidified potting compound) may be conceptually divided into several regions. These are extended region 34, distal region 32, middle region 30, neck region 28, and transition region 26 (some terminations may be readily described using fewer regions and as few as only two—the distal region and the neck region, sometimes also known as the "throat" region). Transition region 26 represents the area where the freely-flexing filaments emerge from the potted region. Extended region 34 (which may not always be present) represents a region beyond the filaments that is 100% solidified potting compound. Distal region 32 represents the region containing filaments that is closest to the distal end of the anchor. The neck region contains filaments and is in the vicinity of the proximal end of the anchor. The behavior of these differing regions differs based on many factors, including: (1) the size of the cable, (2) the type of potting compound used, and (3) the temperature of the components during the transition of the potting compound to a solid.

Once the filaments are placed within the cavity in the anchor, it is very difficult to control their orientation with any specificity. The reader will note that the filaments are roughly arrayed about the anchor's central axis and roughly splayed into a fan. However, each individual filament tends to bend and slew in a random fashion. The random nature of this variance reduces the overall breaking strength of the termination and introduces variability in breaking strength from one termination to the next (since some will have better filament alignment than others).

The depiction of FIG. 18 shows only a few filaments for visual clarity. An actual cable may have several thousand to several million such filaments in the potted region. It is not possible to neatly arrange the filaments because there is no way to grip and hold them. One could conceptually improve the alignment by adding tension to the cable while the potting compound is still in a liquid state, but of course this action would simply pull the wetted filaments out of the anchor.

Another known problem is the difference in the filament-to-potting-compound ratio for different regions of the cavity. The distal extreme of the cavity tends to be rich in liquid potting compound and lean in filaments. The proximal extreme is just the opposite—packed with filaments with only a small amount of liquid compound seeping or wicking into the voids.

Many potting compounds are cross-linking polymers—such as epoxies. When the two constituents of such compounds are mixed an exothermic reaction is produced. The cross-linking rate is highly dependent upon temperature. To some extent the ultimate strength of the cross-linked solid is dependent upon temperature as well. The ideal temperature will vary widely according to the resin type, anchor type, fiber density, and total resin volume. Some heat is often desirable, but too much heat tends to produce short polymer-chain length and can create an overheated situation. In many cases where large amounts of resin are involved, it is actually desirable to cool the anchor and/or resin at various stages in the process.

Looking again at FIG. 18, those knowledgeable of exothermic reactions will perceive that the heating rate will vary within the potted region. In the liquid-rich region the temperature will tend to rise more rapidly than in the liquid-lean region and the cross-linking will occur more rapidly (though the reader should note that for some potting compounds "rapid" may mean several hours up to a day or more). In the liquid-lean region (typically the neck or transition regions), however, most of the volume is consumed by the filaments themselves. Only small "slivers" of potting compound are present and the heat of reaction in these slivers is largely absorbed in heating the filaments. Thus, the temperature in the liquid-lean region rises more slowly and the cross-linking process occurs more slowly.

The local build-up of heat is not easily dissipated because the potting compounds and the filaments themselves tend to be good thermal insulators. This would not be true for a traditional cable made of wire filaments. Because steel is a good thermal conductor, traditional cables do not tend to create a significant temperature variation during the potting process. For synthetic filaments, however, heat transfer is limited.

Another phenomenon existing in the cure process is viscosity variation. This is particularly true for a cross-linking potting compound (though true to some extent for other compounds). When the liquid potting compound begins to heat up in a given area, its viscosity typically drops and it tends to ooze and fill voids more readily. In addition, the decreased viscosity allows the filaments to move more freely within the liquid potting compound. However, as the solid transition continues the viscosity rises and eventually rises a great deal. Thus, for many potting compounds, the viscosity at the initial stage will fall, then rise as solidification occurs.

The present invention seeks to promote thorough infusion of the potting compound through the volume of small filaments. The invention also seeks to exploit the existing phenomena of potting compound curing and in some instances—where the phenomena do not arise naturally—the present invention seeks to create them.

BRIEF SUMMARY OF THE PRESENT INVENTION

The present invention comprises a method for attaching an anchor to an end of a tensile member by inverting the assembly of anchor and tensile member and injecting pressurized potting compound. A length of filaments of the tensile member are placed within a cavity in the anchor. The anchor and filaments are placed in an inverted position, with the distal end of the anchor facing downward and the cable extending upward out of the anchor. If the anchor has an open distal end this is sealed. Liquid potting compound is injected into the anchor cavity and allowed to solidify.

During the solidification process, a controlled translation (pulling) of the cable is preferably introduced. The controlled translation improves strand alignment and load distribution. Rotation may also be used. Various mechanisms are preferably used to reduce or eliminate the formation of a void or voids during the translation process.

Figure 1:
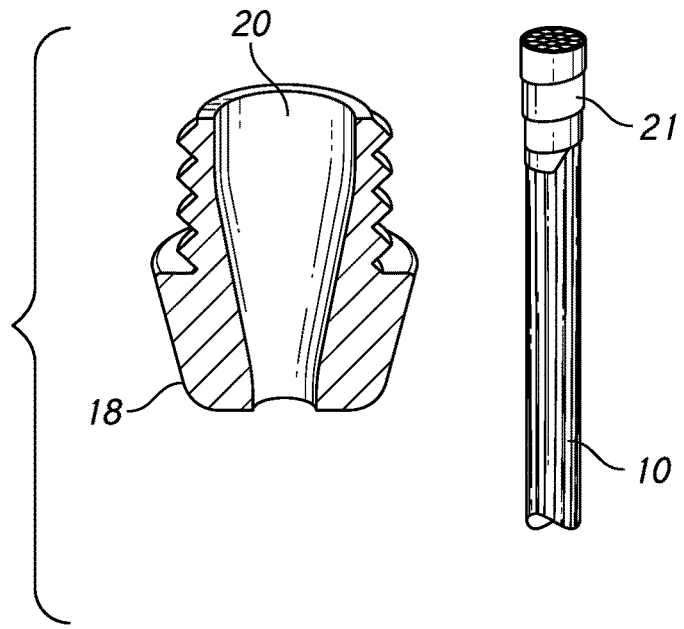
FIG. 1 is a perspective view with a partial section, showing a prior art linear tensile member (a cable) and a prior art end fitting (an anchor).
Figure 2:
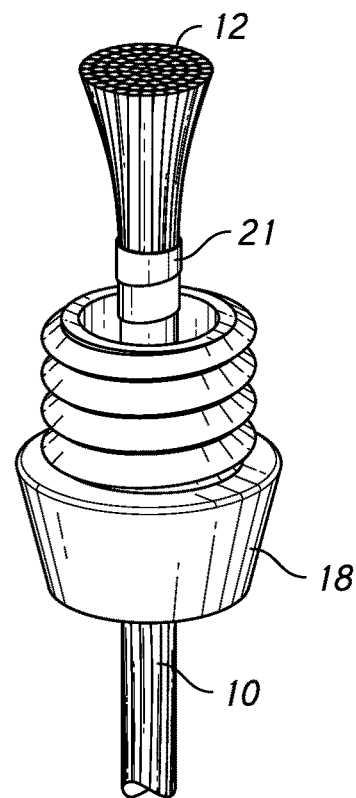
FIG. 2 is a perspective view, showing a prior art anchor being installed on a cable.
Figure 3:
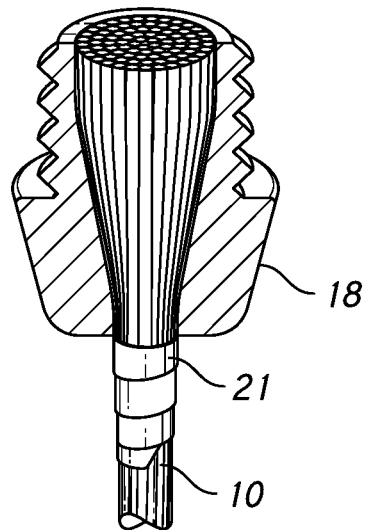
FIG. 3 is a sectional perspective view, showing a prior art anchor being installed on a cable.
Figure 4:
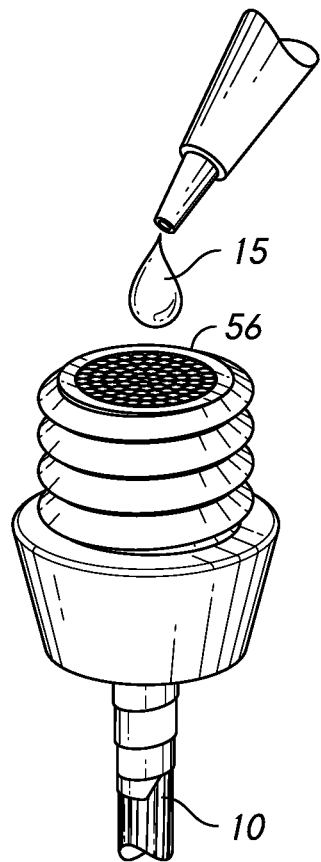
FIG. 4 is a sectional elevation view, showing the components of FIG. 3 after the addition of liquid potting compound.
Figure 5:
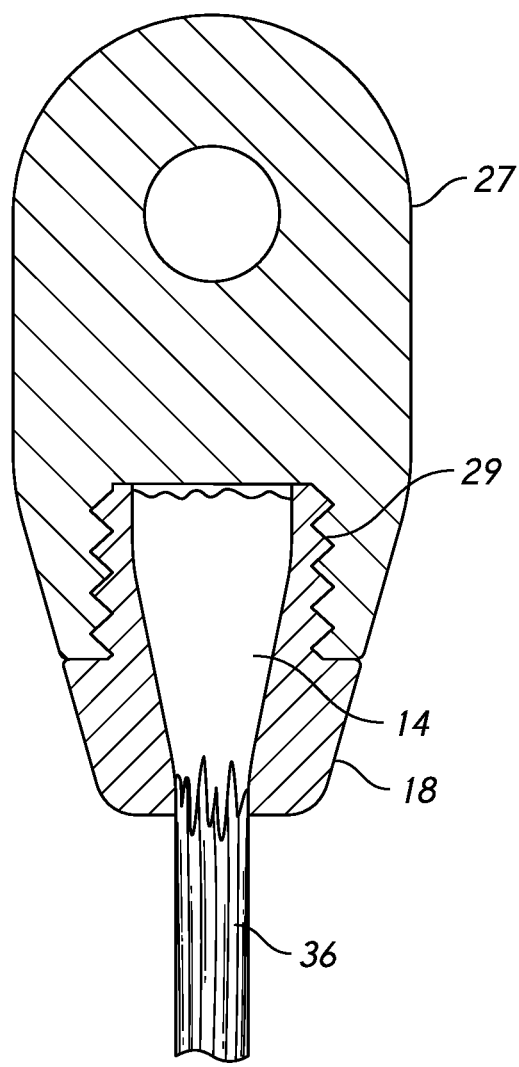
FIG. 5 is a sectional elevation view, showing a completed termination with the addition of an external loading eye.
Figure 6:
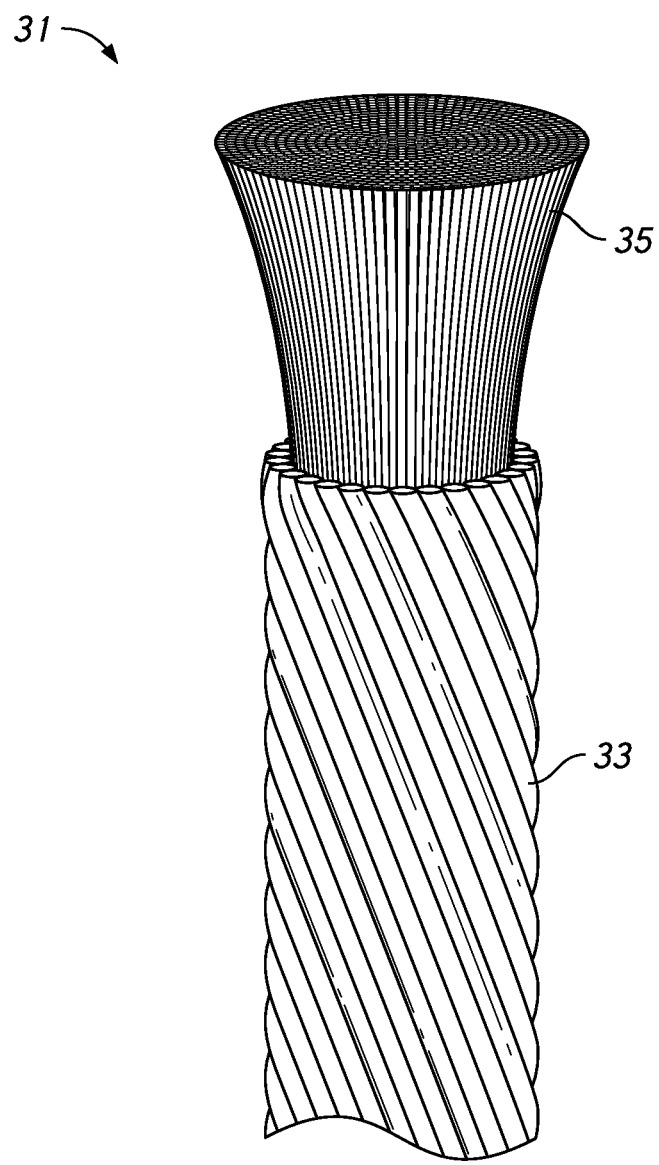
FIG. 6 is a perspective view, showing a prior art hybrid cable including both metal filaments and synthetic filaments.

REFERENCE NUMERALS IN THE DRAWINGS 10 cable
12 splayed filaments
14 potted region
15 potting compound
18 anchor
20 cavity
21 binder
23 orifice
25 runner
26 transition region
27 loading eye
28 neck region
29 threaded engagement
30 middle region
31 hybrid cable
32 distal region
33 metal filaments
34 extended region
35 synthetic filaments
36 unpotted filaments
37 feed line
39 vacuum bag
41 vacuum line
43 vacuum manifold
44 cable clamp
45 port
46 anchor clamp
47 vent
48 cable receiver
49 injector needle
50 cable receiver
51 auxiliary liquid
52 retaining plate
53 injector needle
54 proximal end
55 orifice
56 distal end
57 runner
58 thermocouple
59 runner
60 thermocouple
61 piston
62 thermocouple
63 valve body
64 sealer
65 diaphragm
67 vent
85 injector manifold
87 seal head
89 threaded engagement
90 pocket
92 vacuum bag
94 cable coil
96 ring collar
98 threaded interface
100 tapered orifice
102 tapered tip
104 disposable injector
106 hose
108 piston
110 tapered seal
112 vacuum chamber
114 threaded interface
115 O-ring
116 impermeable jacket
118 vacuum port
120 plug
122 cable opening
124 expandable diaphragm port
126 multi-port sealer
128 strand
130 collector
132 strand channel
134 anchor pocket
136 shoulder
138 attachment feature

DETAILED DESCRIPTION OF THE INVENTION

Figure 7:
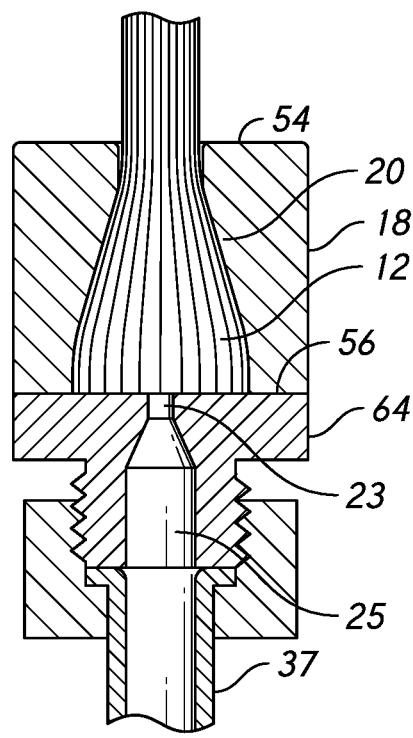
FIG. 7 is a sectional elevation view, showing an inventive embodiment where liquid potting compound is injected through the sealer.
Figure 8:
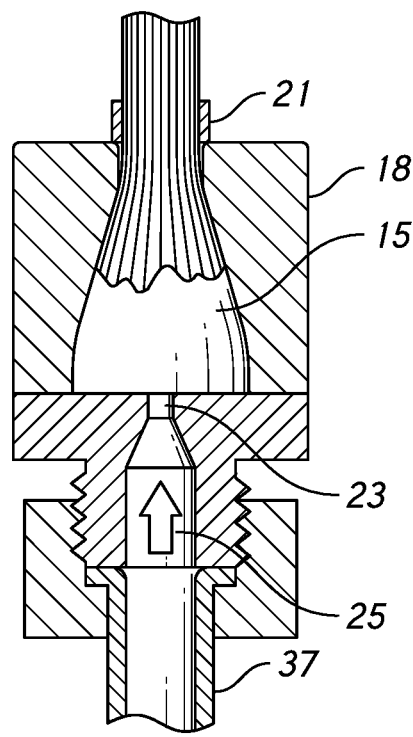
FIG. 8 is a sectional elevation view, showing an inventive embodiment where liquid potting compound is injected through the sealer.

The present invention presents a new approach to introducing the potting compound used in potted termination. FIGS. 7 and 8 illustrate the basic principles. The cable filaments are placed within cavity 20 of anchor 18 as before. However, the cable and anchor are inverted as shown in the view (inversion may occur at any suitable point in the process). Distal end 56 of anchor 18 faces downward and proximal end 54 faces upward. The orientation is significant to the invention.

While the inverted orientation is maintained, pressurized liquid potting compound is injected into cavity 20. This may be done in a wide variety of ways. In the embodiment of FIG. 7, sealer 64 has been used to close the open distal end of anchor 18. Sealer 64 includes features to facilitate the injection of the potting compound. Feed line 37 leads to runner 25 which leads to orifice 23. Pressurized liquid potting compound is fed through feed line 37 and into cavity 20 via orifice 23.

The term "inverted" shall not be understood as limited to a purely vertical orientation in which the proximal end of the anchor is directly above the distal end. Any orientation in which the proximal end is substantially higher than the distal end shall meet the definition of the term, with orientations where the central axis of the anchor is at least 45 degrees above the horizontal being preferred.

FIG. 8 shows the injection in progress. Binder 21 is applied to the cable where it exits the anchor. This is intended to restrict the outflow of the potting compound. Potting compound 15 infuses throughout the cavity. The level of liquid rises as more potting compound is injected. Air is displaced from the cavity and out the proximal end of the cavity. Vents may be added to control the airflow, as explained subsequently.

The goal is to continue the injection until the cavity within the anchor is substantially filled by liquid potting compound and cable filaments. The phrase "substantially filled" means that 80% or more of the total volume of the cavity is filled by liquid potting compound and cable filaments. The "volume of the cavity" in question only extends to the distal limit of the filaments themselves. In other words, some air space with no filaments and no potting compound may remain in the distal portion of the anchor and this will not be calculated in the 80%. The filling percentage only refers to that volume in which filaments are present within the anchor. Some air bubbles or other pockets may remain, but 80%+ is preferably filled. A goal of the present invention is to completely fill the volume, though the complete elimination of all voids is likely not possible.

Figure 9A:
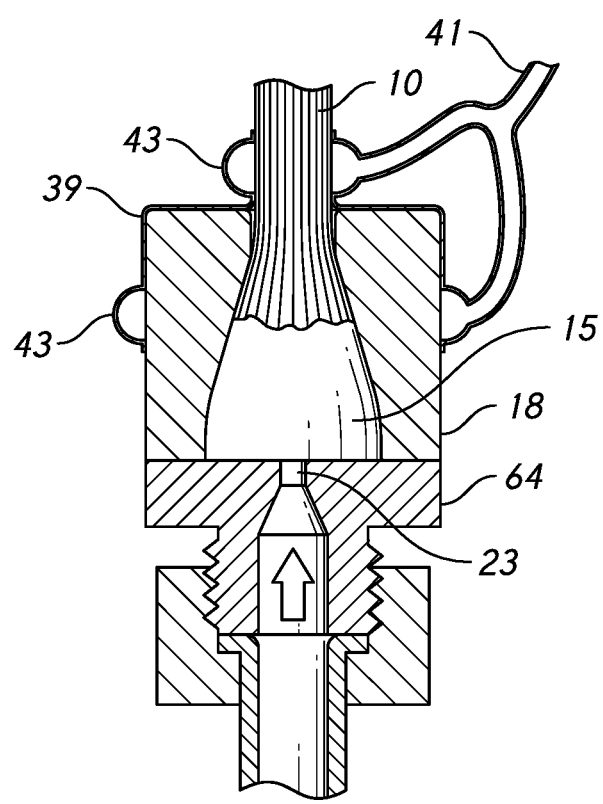
FIG. 9A is a sectional elevation view, showing the use of a vacuum bag to seal the proximal end of the anchor.

One issue is the control of pressurized potting compound seeping out of the anchor. The distal end is controlled by the sealer. The proximal end is more challenging, however, as the cable itself interferes with an effective seal. FIG. 9A shows one way to address this issue. In this embodiment, sealer 64 is present as for the prior embodiment. Vacuum bag 39 is added to seal the proximal end.

Vacuum bags are well known in the field of composite manufacturing where they are used to extract air pockets when epoxy resin is pumped into a reinforcing fiber matrix. The bag shown in FIG. 9A has a small diameter portion configured to fit around the cable and a large diameter portion configured to fit around the anchor. Vacuum line 41 attaches to vacuum manifolds 43. When vacuum is applied, the flexible bag material is pulled tightly against the cable and the anchor. This creates an effective seal. In addition, the application of pressure near the bottom of the assembly (the pressurized potting compound) and vacuum near the top promotes the flow of the potting compound 15 through the cable filaments and promotes the displacement of any remaining air.

The bag could be extended all the way around sealer 64, leaving only an expandable portal for the introduction of the injector hardware. When vacuum is applied to the bag in such a version the bag would seal tightly around the feed line.

Figure 9B:
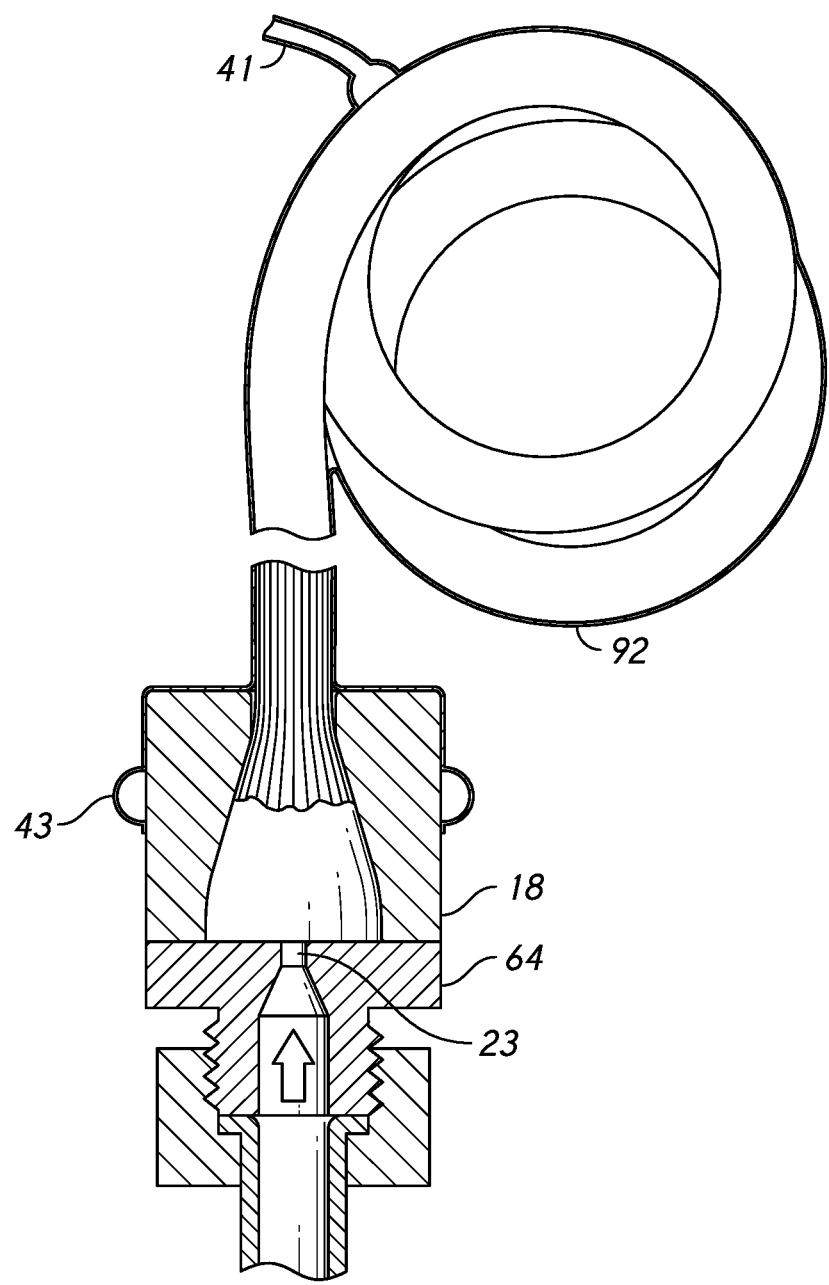
FIG. 9B is a sectional elevation view, showing the use of a larger vacuum bag to seal the proximal end of the anchor.

In the version of FIG. 9A one challenge is creating an effective seal between the bag and the cable. The cable is often quite flexible and its cross-sectional shape is changeable—particularly if no jacket is present. In such an instance a seal is difficult to obtain. The embodiment of FIG. 9B presents one solution to this problem. In this embodiment a large vacuum bag 92 is used. The bag has one open end and one or more vacuum lines 41. Cable coil 94 is placed in the vacuum bag and the open end is placed over anchor 18.

Vacuum is then applied to the bag and liquid potting compound is injected as before. A transparent bag material may be used so that the seeping of potting compound out the proximal end of the anchor may be observed. Other containment devices may be applied as well—such as a collar around the exit of the cable from the anchor's proximal end. In fact, any of the containment devices disclosed elsewhere in this application may be combined to produce the desired result.

Figure 29:
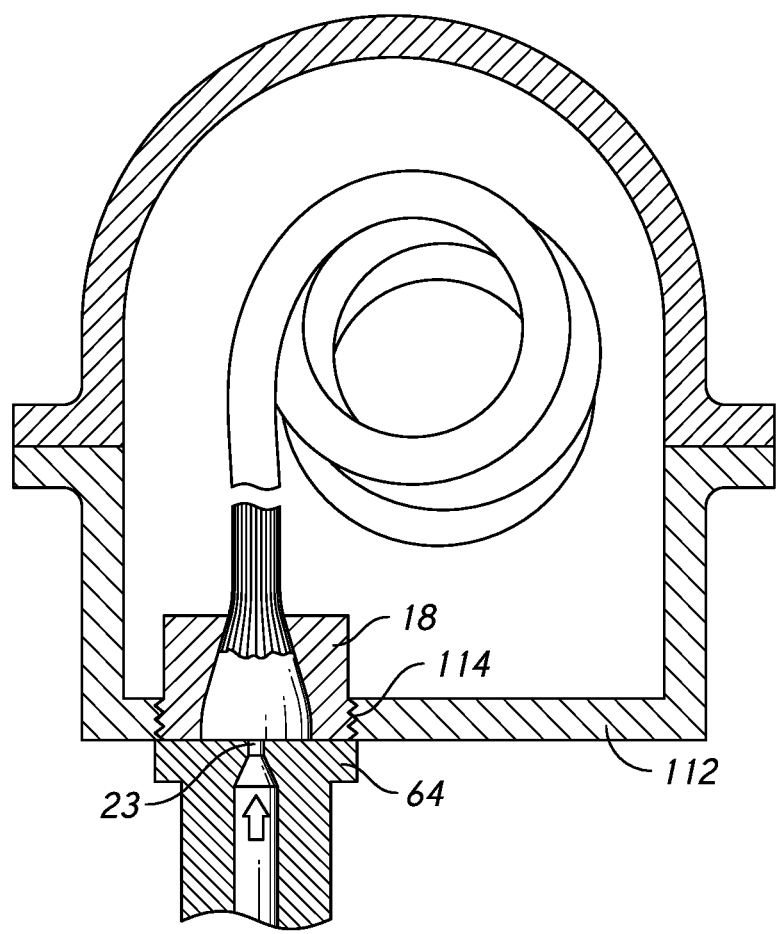
FIG. 29 is a sectional elevation view, showing the use of a vacuum chamber housing the anchor/cable assembly during the inverted injection process.

FIG. 29 depicts still another approach to the application of vacuum. In this version the anchor and cable are placed in a rigid vacuum chamber. Anchor 18 is actually threaded into a receiver in one wall of the vacuum chamber to create threaded interface 114. Sealer 64 is pressed against the anchor's open end. Potting compound is then injected as vacuum is applied to the interior of the vacuum chamber.

One advantage of using a vacuum chamber is its ability to apply positive pressure as well. A vacuum can be applied until sufficient potting compound has been injected to completely fill the anchor's central passage. At that point positive pressure can be applied in the vacuum chamber to prevent any further "creep" of the liquid potting compound into the freely-flexing part of the cable. The positive pressure is commonly useful to compress any gas bubbles existing in the potting compound during or after the infusion process. Similar to many composite manufacturing processes, the addition of pressure during the curing process helps to minimize the existence and size of air voids.

Another advantage of using a chamber to enclose the cable is the fact that conditions other than vacuum can be monitored and controlled. For example, one can control the cure rate of the potting compound by increasing or decreasing the temperature within the chamber. One can also control other parameters such as humidity. In fact, the chamber illustrated will in some cases not apply pressure or vacuum, but will instead just be used to regulate the temperature of the components within the chamber.

Figure 30:
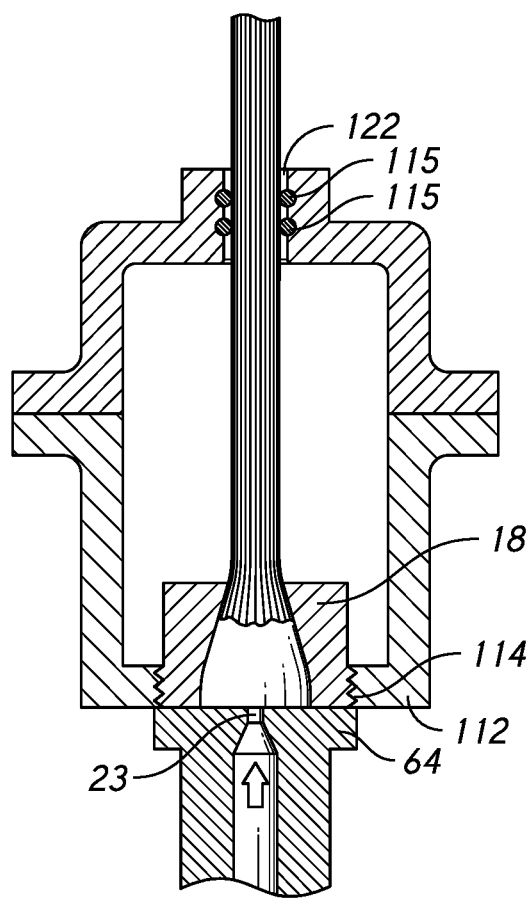
FIG. 30 is a sectional elevation view showing the use of another type of vacuum chamber.

Different configurations may be employed for the vacuum chamber itself. FIG. 30 shows a vacuum chamber 112 which contains only a portion of the cable. Anchor 18 is sealed to the chamber via threaded interface 114. The cable itself exits the vacuum chamber through cable opening 122. Leakage around the exiting portion of the cable is controlled using one or more O-rings 115. The upper portion of the vacuum chamber may be split so that it can be clamped tightly about the exiting portion of the cable. Vacuum may be applied during the injection process as before.

It is important at this point to state that a perfect seal between the cable and its exit through the vacuum chamber is unrealistic. Some leakage will occur. Thus, it is preferable to use a vacuum pump (or other vacuum source) connected to vacuum chamber 112 and to select a pump that can maintain the desired vacuum despite the expected leakage. In this scenario some air flow through the vacuum chamber will occur for as long as the vacuum is applied.

If the chamber is used just to regulate temperature (without applying pressure or vacuum) then the seal between the cable and the exit can be fairly loose. A gap may even be allowed to remain.

The configuration of FIG. 30 is most effective when the cable itself includes an impermeable jacket around its exterior (otherwise a reasonable seal at cable opening 122 will be difficult to achieve). However, even where a jacket is present, considerable leakage may occur through the core of the cable construction, with air being drawn in through the far end of the cable. In that case a sealer may be infused between the strands one the far end of the cable. While the seal will likely not be perfect, the use of additional flow or volume will help to maintain the desired pressure or vacuum.

Figure 31:
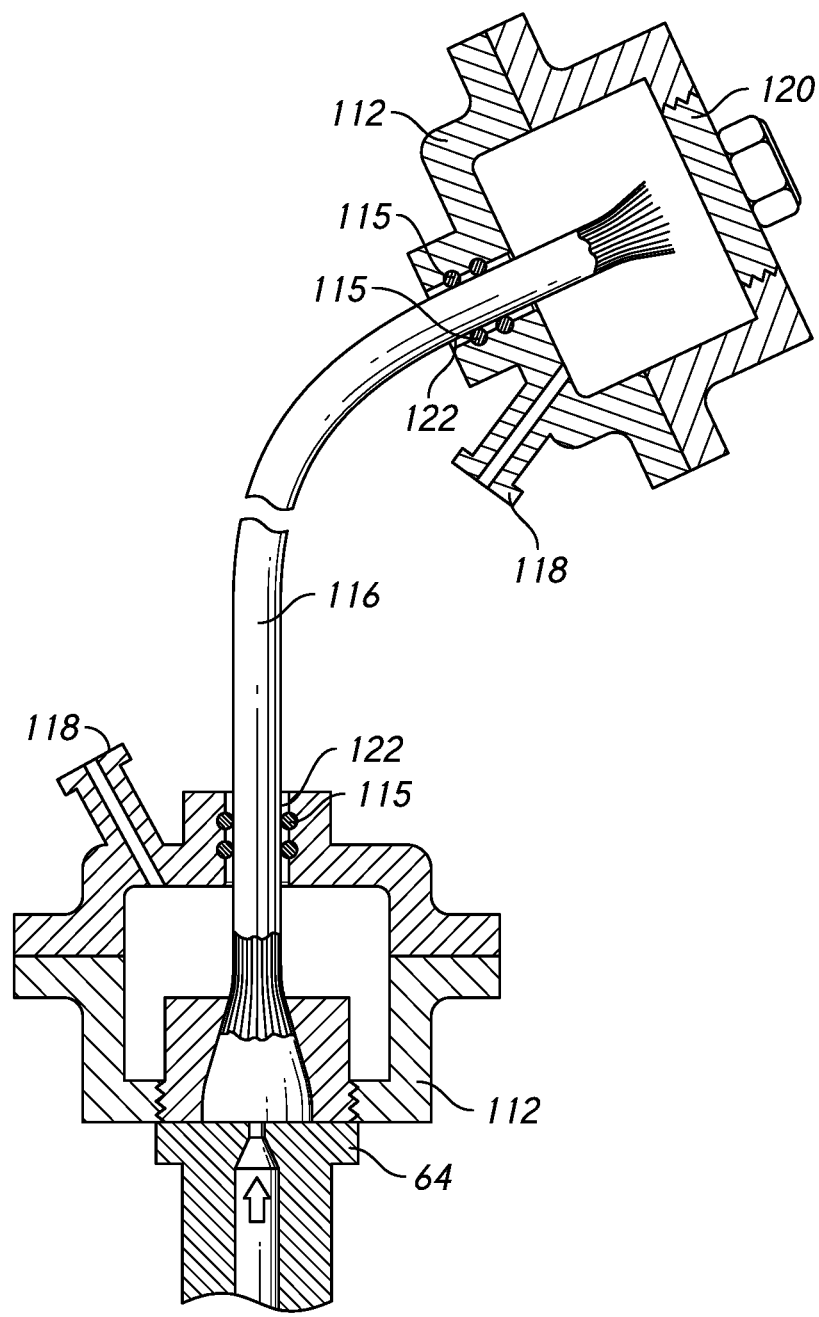
FIG. 31 is a sectional elevation view, showing the use of two separate vacuum chambers.

FIG. 31 presents still another configuration intended to address the concern of leakage through the cable. In this version two vacuum chambers 112 are employed. The lower chamber has the same configuration as described previously. The second vacuum chamber 112 (the higher depiction in the view) is clamped onto the far end of the cable. A break is shown in the cable depiction. The reader should bear in mind that the cable might be quite long—100 meters or even more. There might in fact be a large coil of cable in between the two chambers.

The second vacuum chamber is equipped in this embodiment with plug 120 to seal it. O-rings 115 provide a good seal against the cable's impermeable jacket 116. Vacuum is then applied to the two vacuum ports 118. The reader should note that the vacuum (or pressure) applied to the two chambers is not necessarily the same.

The invention can be carried out using one or more potting compound injectors, vents, vacuum bags, or other seals. The drawings referenced in the following descriptions illustrate additional embodiments. The reader should bear in mind that a feature shown in one embodiment may be combined with another embodiment. It is not practical to illustrate every conceivable combination.

Figure 10:
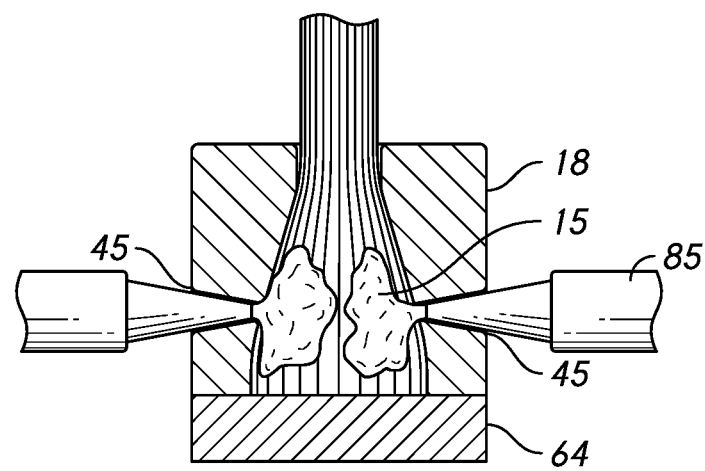
FIG. 10 is a sectional elevation view showing injection of potting compound through ports in the anchor.

FIG. 10 shows a version where the injection is made through a pair of ports 45 in the side wall of the anchor itself. Sealer 64 seals the distal end as before. An injector manifold 85 is placed in each port 45 and potting compound 15 is injected into the cavity. One, two, three, or more such ports and manifolds may be used.

Figure 11:
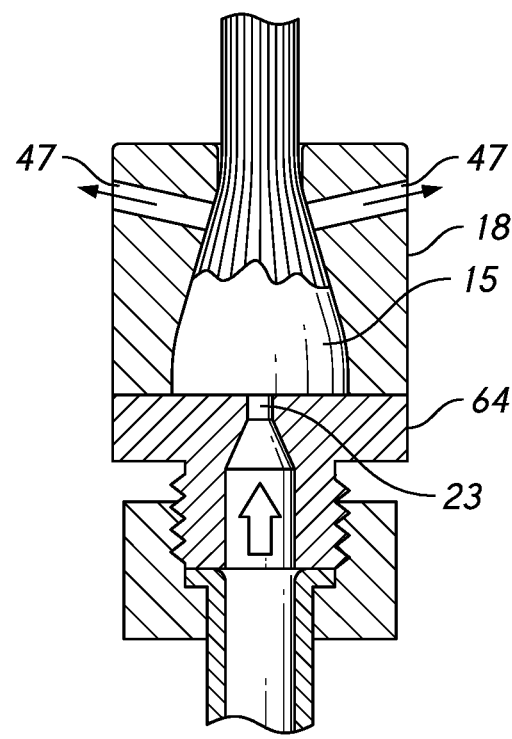
FIG. 11 is a sectional elevation view showing an embodiment including vents inthe anchor.

FIG. 11 shows an embodiment combining potting compound injection through sealer 64 with vents 47 through the wall of the anchor. Air displaced by the rising potting compound flows out through the vents. Once the air is displaced the vents may be temporarily plugged until the potting compound is sufficiently solid. The angle of the vents may be increased so that they exit through the proximal surface of the anchor rather than the side wall.

Figure 12:
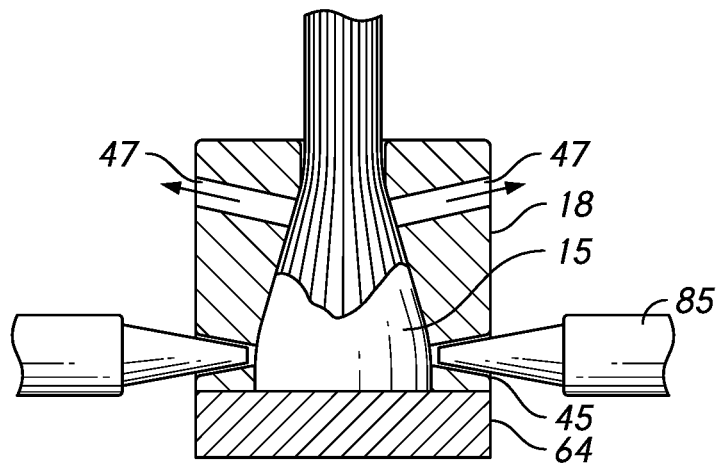
FIG. 12 is a sectional elevation view showing an embodiment incorporating both anchor ports and vents.

FIG. 12 shows an embodiment including both ports 45 and vents through the anchor. A pair of injector manifolds 85 is used to feed pressurized potting compound into the cavity. Though not shown in the view, sealing devices (such as pliable O-rings) may be added to ensure a positive seal between each injector manifold and the anchor.

Figure 13:
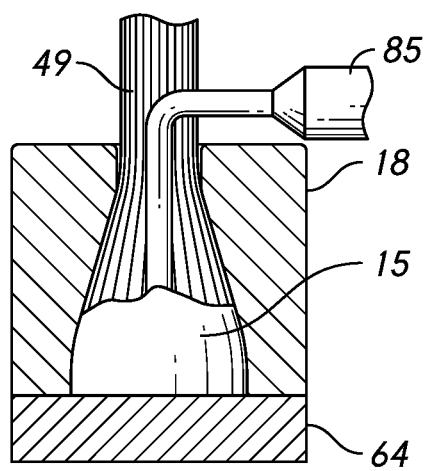
FIG. 13 is a sectional elevation view showing the use of an injector needle.

FIG. 13 shows still another embodiment. In this version, sealer 64 once again closes the distal (bottom) end of the anchor. However, an angled injector needle 49 is used to introduce the potting compound. Injector manifold 85 feeds potting compound into the injector needle. The needle is introduced into the strand cavity by passing it through the throat region.

It is generally undesirable for the potting compound to creep up beyond the proximal portion of the anchor (the uppermost portion in the inventive method). Some capillary wicking may occur. The problem is sometimes exacerbated by the concept of injecting the potting compound under pressure. The use of pressure tends to promote the upward creep and may also promote the lateral flow of liquid potting compound away from the throat region.

Figure 14A:
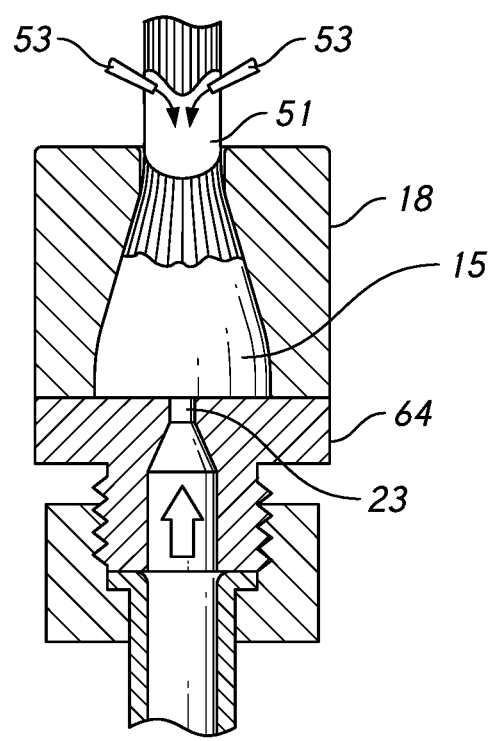
FIG. 14A is a sectional elevation view showing the use of an auxiliary liquid to control the flow of the liquid potting compound.

This unwanted flow may be stopped through the use of binder tape or vacuum bags. Another approach is to inject a second, different liquid. FIG. 14A shows an embodiment in which two injector needles 53 are fed a short distance into the cable structure proximate the throat region. These needles are used to inject auxiliary liquid 51. The auxiliary liquid can be any substance that impedes the flow of potting compound and does not otherwise harm the cable assembly. One example is a viscous silicon oil. Another example is a wax. A third example is a foam. Once the termination is completed, the auxiliary liquid may be removed (such as by melting out the wax) or simply allowed to seep out over time.

Figure 14B:
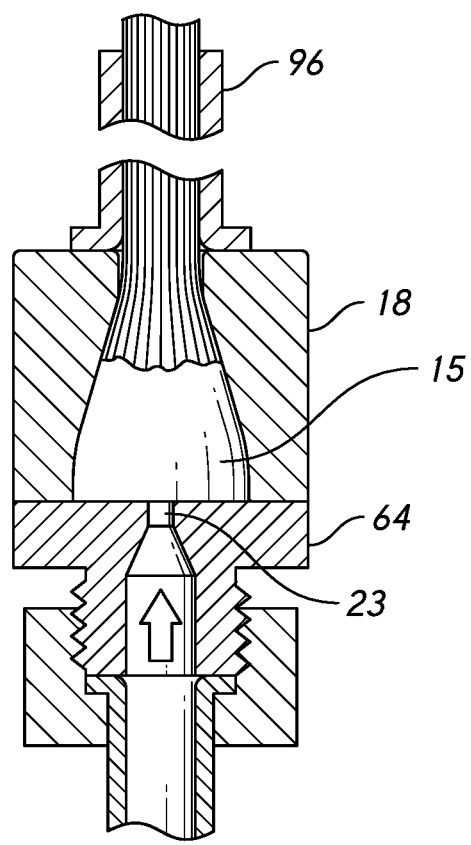
FIG. 14B is a sectional elevation view showing the use of a ring collar to control the flow of the liquid potting compound.

The embodiment of FIG. 14B depicts a different containment approach. Ring collar 96 has been added proximate the anchor exit. The ring binder may be made of flexible material configured to slide along the cable. It may be quite long—such as 20 cm long—so that frictional engagement between the ring binder and the cable holds the ring binder in position. The ring binder may also be made as two halves that are connected together. It could even be made of a frangible material that is broken away and discarded once the injection process is completed.

The use of pressurized injection while the anchor is in an inverted state improves the saturation of liquid potting compound in the anchor's cavity. It also assists in the expulsion of air, among other things. However, inverted injection does not address the previously discussed problem of strand alignment within the potted region. In order to address this problem, it is advantageous to apply tension to the cable and actually pull the cable through a small, controlled translation while the potting compound is transitioning to a solid. In order to explain the motivation for this part of the process, some of the characteristics of the solidification process will be discussed.

Figure 18:
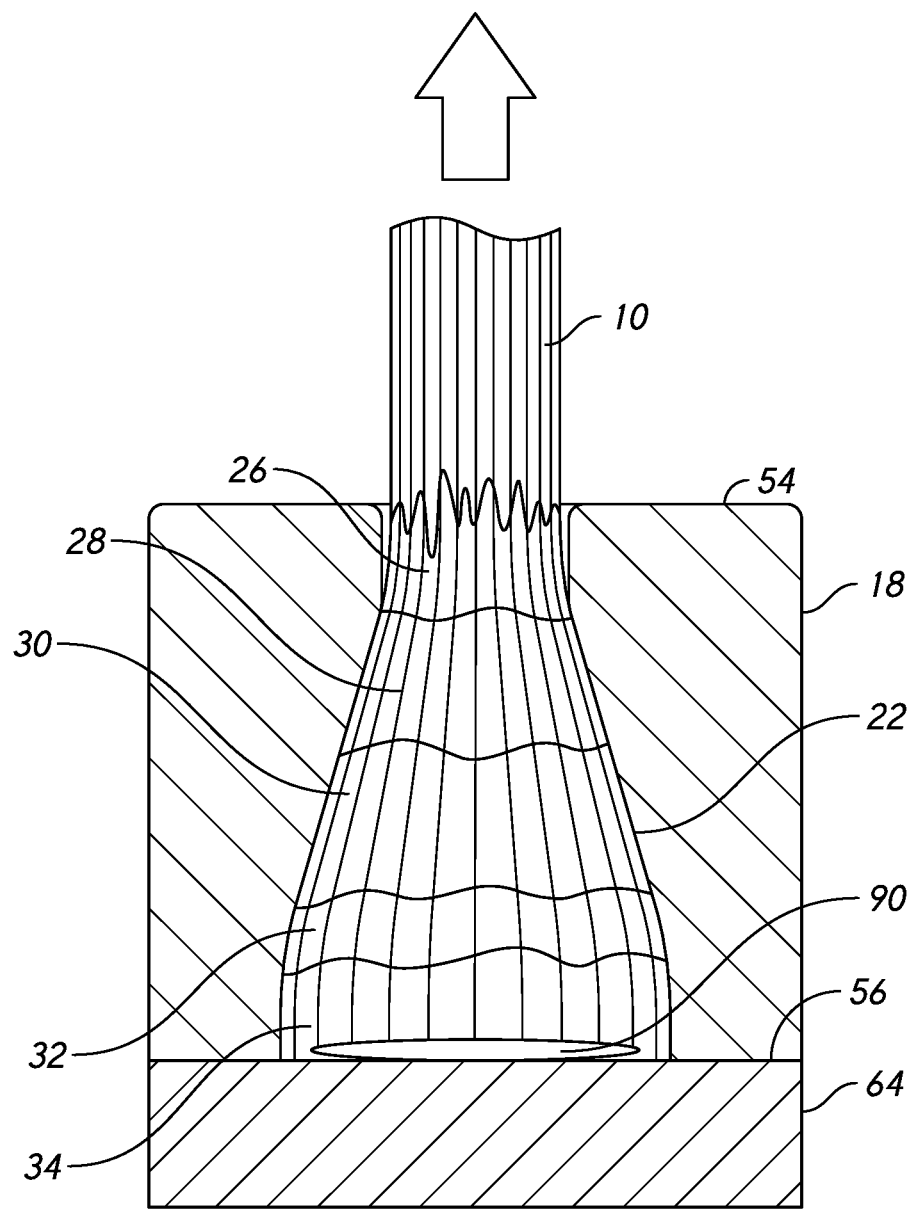
FIG. 18 is a sectional elevation view, showing the creation of a pocket proximate the sealer.

Looking again at FIG. 18, the reader will observe that the cable filaments are more closely packed at proximal end 54 than at distal end 56 (since the cavity through the anchor expands proceeding from the proximal end to the distal end). Because of this expansion, distal region 32 has a higher ratio of potting compound to filaments than neck region 28. This is true because the cross sectional area of the filaments is the same for both regions, but the cross-sectional area of the expanding cavity is larger in distal region 32. Thus, in distal region 32 the gaps between the filaments are larger and these gaps are filled by the liquid potting compound.

If a potting compound has an exothermic cross-linking transformation (common for epoxies, polyesters, and many other compounds), then more heat will be generated in distal region 32 as compared to neck region 28. This is true because the distal region has a higher concentration of liquid potting compound and a lower concentration of inert filaments tending to absorb the heat produced. The result is that the temperature will rise faster in distal region 32. The heating process tends to build upon itself since both the potting compound and the filaments tend to be good thermal insulators. The temperature in the liquid-rich region will rise as the solidification reaction of the potting compound begins. The heat cannot easily be conducted away and the rising temperature causes the solidification process to accelerate. The acceleration of the reaction in turn generates still more heat. The situation is analogous to a "thermal runaway" in electrical circuits (though it is not so abrupt or extreme). One of the reasons that slow-transforming potting compounds are often used in large terminations is to prevent the build-up of too much heat, which can actually damage the synthetic filaments.

The rate of cross-linking of such potting compounds is dependent upon temperature. A higher temperature produces a higher cross-linking rate and thus a higher rate of transition to the solid state. The result is that the potting compound in the distal region transitions to the solid state before the potting compound in the neck region. The present invention takes advantage of this phenomenon and in some embodiments actually seeks to control and modify this phenomenon.

The potting compound within distal region 32 is allowed to "set" sufficiently to control the motion of the cable filaments while some amount of tension and/or translation is applied to the cable. The application of the tension and/or translation tends to improve two physical characteristics of the filaments within the potted region. These are: (1) filament alignment, and (2) effective load sharing. In most cases, the second phenomenon tends to be more important. However both will commonly impact breaking efficiency and repeatability.

Looking at FIG. 18, the reader will observe how the filaments 38 within the liquid potting compound are oriented. They run roughly in the same direction as the central axis of the cable. However, many filaments are not completely straight. Instead, they curve and slew laterally with respect to the central axis of the cable (Some divergence is obviously desirable for an expanding anchor cavity but a disorganized "curvy" arrangement is not desirable). The inventive process improves filament alignment so that the unwanted curvature is reduced or eliminated in certain regions.

Of even greater importance is the variation in axial or longitudinal position of the filaments, which impacts the load sharing between filaments when the tensile member is loaded. This phenomenon is easier to explain than to illustrate. The millions of filaments typically found in a synthetic cable slip easily over one another as they have little surface friction. Normal handling of a cable will cause some filaments to extend a bit further at the cable's end than others.

In addition, the small filaments' lack of compressive and lateral stiffness means they are easily disoriented during any handling or even the effects of gravity.

High-performance synthetic filaments such as used in the present invention do not stretch much before breaking. Thus, when a cable is loaded in tension, the relatively short filaments carry a larger proportion of the load and the load is not shifted to other, longer filaments because the short filaments do not stretch much. Some long filaments may in fact be completely unloaded.

The present invention is useful in improving load sharing among the filaments so that—for example—the shorter filaments do not carry more load than the longer filaments. It is beneficial in many instances to apply tension to the cable and a small amount of displacement parallel to the cable's central axis while the filaments are still able to "slip through" the potting compound to some extent. Returning to FIG. 18, the invention monitors for a defined transition in the state of the potting compound toward the solid state. This defined transition can be a sufficient hardening to actually lock the filaments in place in a particular region. However, more commonly, the defined transition will be a point in the solidification state that is more like thick syrup. In that state, the applied tension allows the filaments to be pulled through the syrupy potting compound.

The alignment of the filaments is thereby improved. Even more importantly, however, shorter filaments will be translated further than longer filaments and the result will be that each filament is given a more equal share of the tensile load on the cable once the potting compound solidifies. A short thought experiment ably demonstrates this concept. Consider a first filament that has a long portion lying within the anchor cavity (the "long filament") so that the portion of the filament lying within the anchor cavity bends through several curves. Consider also a second filament that has a relatively short portion lying within the anchor cavity (the "short filament") so that the portion of the filament within the anchor cavity is already nearly straight before the inventive process is applied.

Once the potting compound in the anchor cavity region reaches a thick-syrup state tension is applied to the cable and a small and controlled amount of linear motion is permitted (The cable is dragged along its central axis in a direction tending to pull the cable out of the anchor). The "short filament" immediately comes under tension and its free end is dragged through the syrupy potting compound. The "long filament," on the other hand, straightens while its free end remains in place. Preferably, the amount of permitted translation is that amount which just begins to move the free end of the longest filament. Once this amount of translation is reached, the cable is held in place and the solidification of the potting compound continues to completion.

At the end of the process both the "short filament" and the "long filament" have been straightened. The free end of the "short filament" will be closer to transition region 26 than the free end of the "long filament" (since the free end of the short filament has been dragged along). However—once the potting compound is completely solidified—both filaments will tend to come immediately under load as soon as tension is applied to the cable. Thus, the load distribution between the two filaments has been improved.

The reader should note that in this thought experiment the term "short filament" refers to the length of that particular filament lying within the cavity of the anchor and the term "long filament" refers to the length of the other filament lying within the cavity. In fact, the overall length of both filaments may be identical and the overall length of the "short filament" might even be longer than the "long filament." In the thought experiment, longitudinal slippage or some other phenomenon has produced a state where more of the "long filament" is found within the anchor cavity than the "short filament." This is a common occurrence.

Still looking at FIG. 18, the applied tension and translation (as indicated by the arrow) tend to pull the filaments within middle region 30, neck region 29, and transition region 26 straight and provide a more uniform load distribution. These changes produce enhanced overall breaking strength and improve other termination properties as well. Of note, these shifts in position are often ultra-small, such as hundredths or even thousandths of an inch. The depictions in the illustrations are exaggerated so that they can be seen. In reality the movements are quite small. However, they can have a very significant impact on performance. Tension is preferably maintained on the cable while the balance of the potting compound transitions sufficiently toward the solid state to hold the filaments in the alignment achieved.

A defined translation of the cable may be a linear motion of a few thousandths of an inch in a direction parallel to the anchor's central axis of symmetry. It may also be defined in terms of a maximum applied tension once translation has started (Tension being stopped once the defined peak is reached).

The result is typically not perfect. The filaments will not be perfectly aligned nor perfectly organized. However, the inventive method does produce a significant advantage over the disorganized initial state of the filaments.

It is helpful for the reader to consider some of the properties of potting compounds. In particular, those compounds that transition from a liquid state to a solid state via an exothermic reaction. Many if not most of these compounds undergo a cross-linking transformation in which short molecular chains add additional links to become longer and longer. The longer molecular chains also tends to curl, creating cross links between adjacent chains. The result is a non-crystalline solid.

Those knowledgeable in the field will know that polymer cross-linking is not a single transformation like would be the case with many metals. Rather, the polymer tends to smoothly transition from one state to another. At a first time it may be a low-viscosity liquid that smoothly flows under the influence of gravity. At a second later time it may transition to a syrup-like consistency. At a still later time it may be a spongy solid. At a still later time it may ultimately transition to a hard solid (though never with a crystalline structure).

In addition, many cross-linking polymers go through a "B stage" transition explained previously. They start with one viscosity at ambient temperature when the two constituents are mixed. Heat produced by the exothermic reaction causes the viscosity to drop (in some instances substantially). Later, as the cross-linking progresses the viscosity climbs again and ultimately the cross-linking produces a solid.

The present invention does not need to wait for the potting compound in the distal region to transition to a hard solid. Even a thick "syrupy" consistency is enough to allow a small amount of tension and resulting translation to be applied to the cable. The process will vary depending upon many factors such as:

1. The potting compound used;
2. The mix ratio of the potting compound;
3. The size and shape of the cavity;
4. The anchor materials used;
5. The size, type, and distribution of the filaments;

6. Any internal hardware or components that rest in the cavity; and
7. The heating and/or cooling applied.

Figure 15:
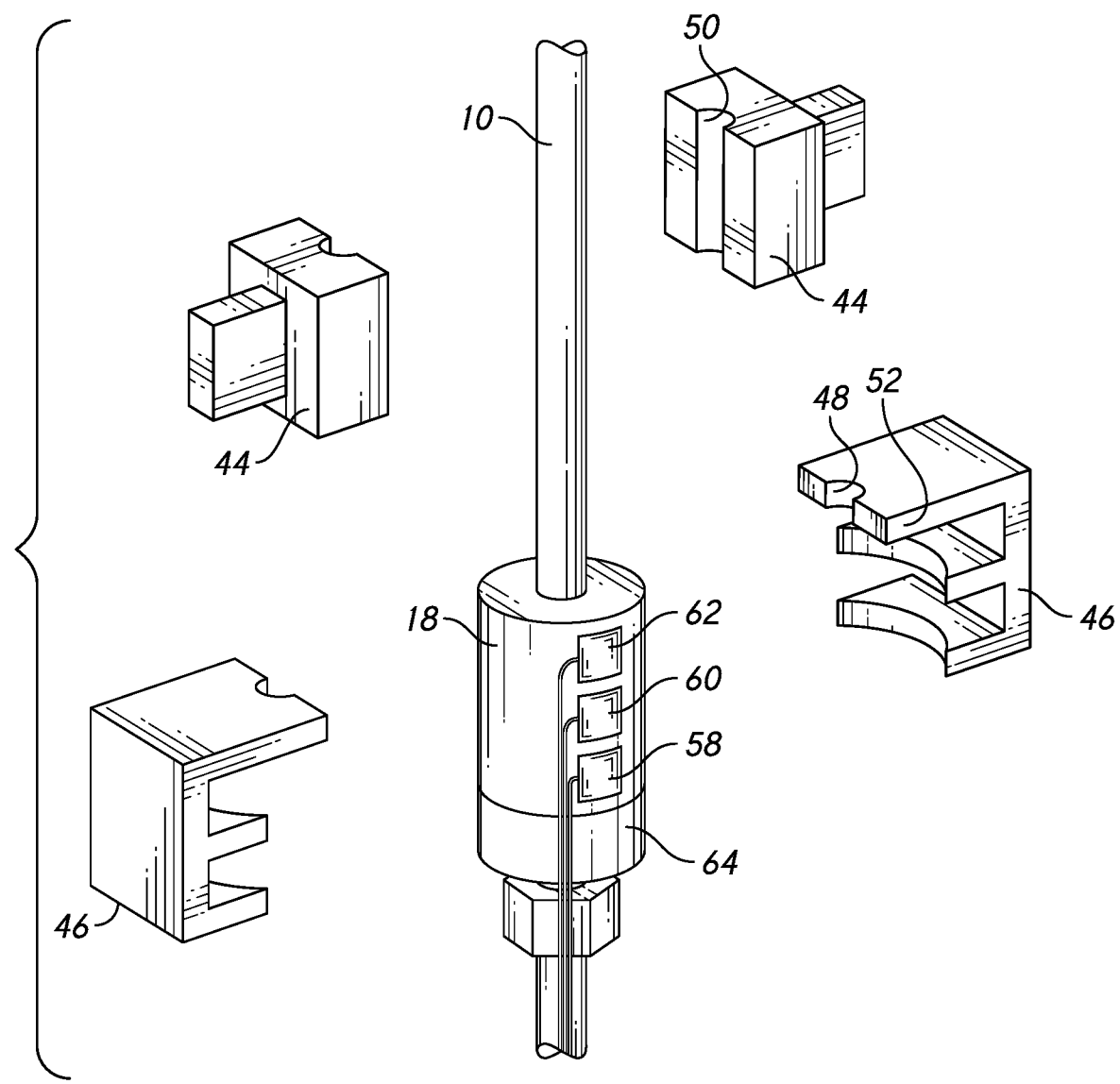
FIG. 15 is an exploded perspective view, showing some exemplary components used to add tension to a cable while the potting compound is solidifying.

Some specific examples will serve to aid the reader's understanding. FIG. 15 shows one exemplary apparatus configured to carry out the present invention. A length of filaments from cable 10 is placed in a cavity within anchor 18 as explained previously. The assembly of cable and anchor in this example has been inverted as explained previously, so that the distal end of the anchor faces downward. Sealer 64 is placed over the distal end to prevent the liquid potting compound running out the bottom of the assembly. In this version liquid potting compound is injected through the sealer.

Two anchor clamps 46 are provided. These include engaging surfaces configured to bear against and hold anchor 18 in place. In addition, they include retaining plate 52 positioned to slide over the top of the anchor (in the orientation of the view). A cable receiver 48 is provided in each retaining plate 52 so that the cable itself is free to slide with respect to the anchor clamps.

Two cable clamps 44 are provided. Each of these includes a cable receiver 50 that is sized to fit around the cable. The cable clamps are configured to frictionally engage and hold the cable so that they may apply tension to the cable. In order to do this engaging features may be included in the cable receiver. Exemplary engaging features include rubber inserts, ribs, knobs, and knurls. Other ways to apply tension to the cable include applying a temporary anchor to the free end and wrapping a length of the cable around a moveable or driven capstan.

It is preferable in the present invention to determine when a "defined transition" has taken place in the potting compound ("defined transition" meaning that the potting compound in some region of the cavity—such as the distal region—has reached a suitable viscosity or cure state). If the transition of the potting compound to a solid is an exothermic reaction, then the measurement of temperature is a good proxy for actually measuring the viscosity in the distal region. Thus, the embodiment of FIG. 15 includes temperature sensing devices. One or more thermocouples (58, 60, and 62) are installed to monitor the temperature of anchor 18 at various points. These thermocouples are connected to monitoring circuitry which converts their output to a temperature parameter. A single thermocouple will often be sufficient—particularly when the anchor is made of a thermally-conductive metal.

Figure 16:
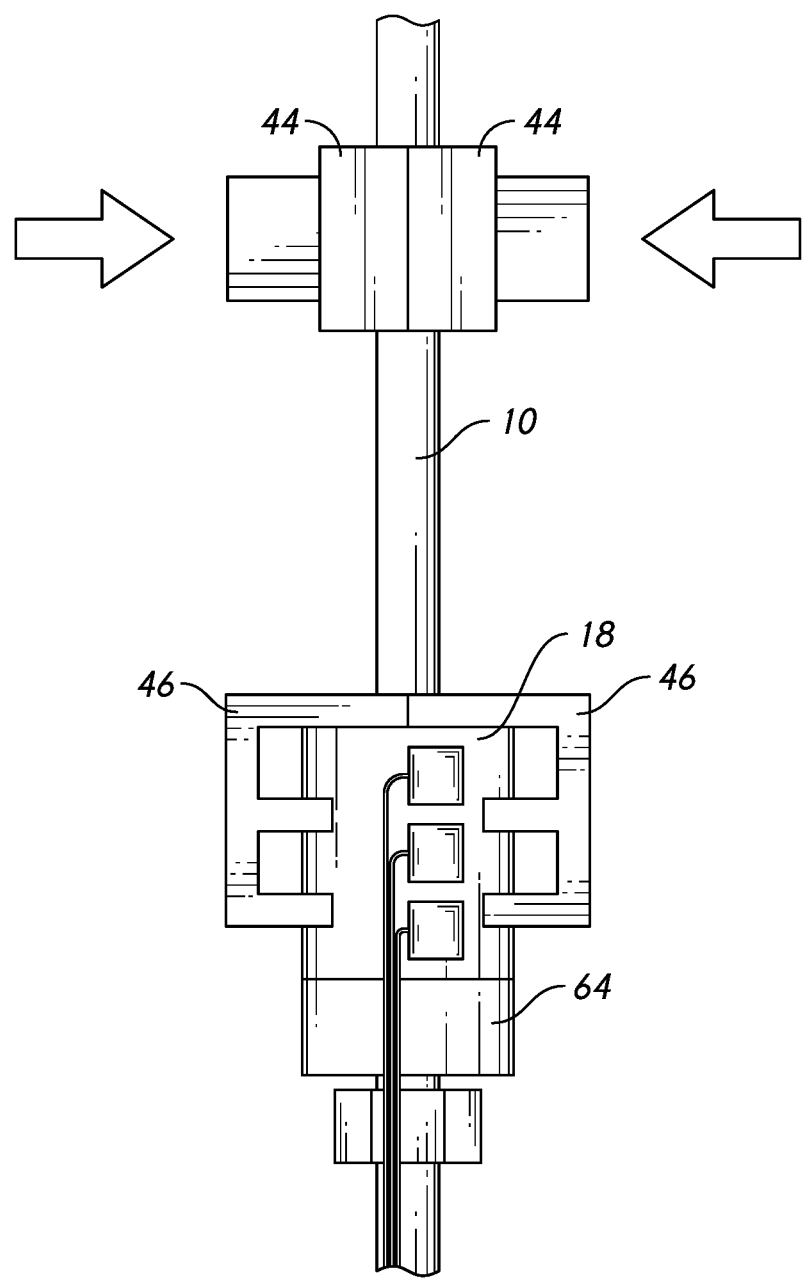
FIG. 16 is an elevation view, showing the use of the components of FIG. 15.

FIG. 16 is an elevation view of the assembly of FIG. 15 after the anchor clamps and cable clamps have been clamped inward as indicated by the arrows. In this configuration the anchor is held securely by the two anchor clamps 46 while the cable is held securely by the two cable clamps 44.

Once the components are clamped in place, monitoring begins for the defined transition of the potting compound in the distal region of the expanding cavity. This "defined transition" is the point at which the potting compound in a certain region is at the desired point in its transition toward being a solid such that tension and/or translation may be applied to the cable in order to produce the necessary straightening and improved load distribution results.

Figure 17:
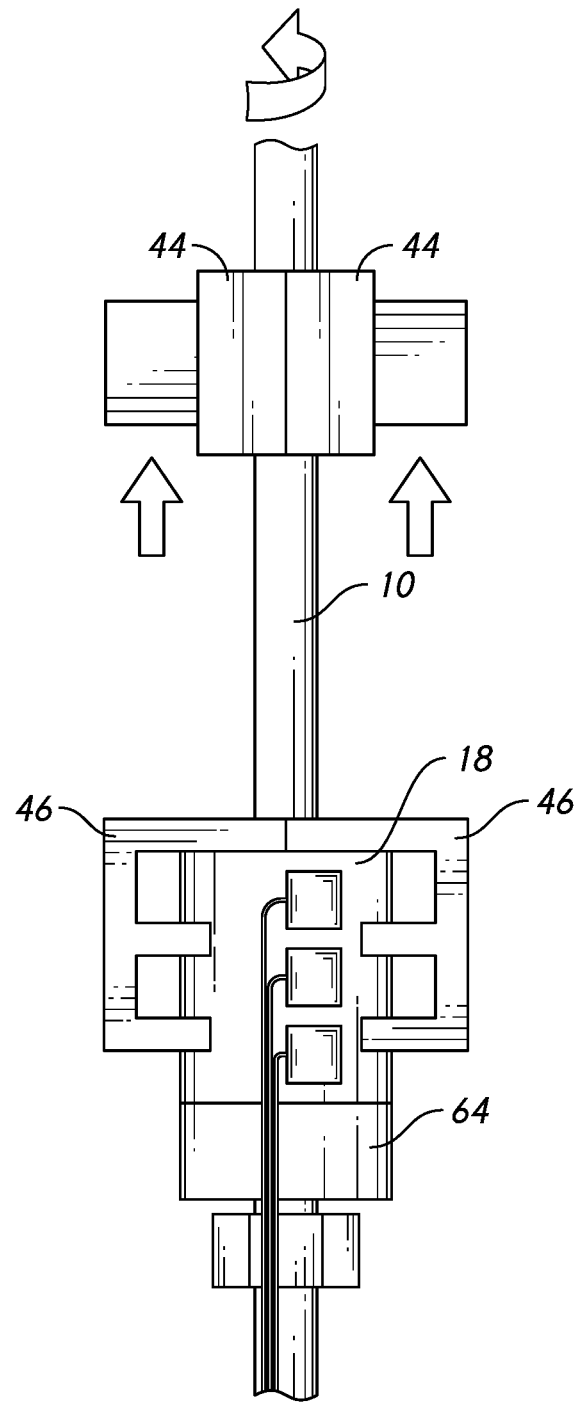
FIG. 17 is a sectional elevation view, showing the use of the components of FIG. 15.

FIG. 17 shows the step of applying tension. Tension may be applied by (1) fixing the anchor position and pulling the cable clamps 44 upward, (2) fixing the cable clamps and pulling the anchor downward, or (3) a combination of the two. When a pulling force is applied, tension in the cable will typically spike and then slack off as the filaments begin to pull through the potting compound. Preferably, further translation of the cable is stopped at this point. Some tension may or may not be continued after translation has stopped. A rotational motion may be applied as well (as indicated by the curved arrow).

One of the simplest ways to monitor for the defined transition in the potting compound is to monitor the temperature of the anchor using one or more thermocouples. If the same initial conditions are used (same potting compound at the same initial temperature in the same anchor/cable assembly at the same relative positions), then one may experiment to determine what measured anchor temperature corresponds to the achievement of the defined transition in the potting compound in a desired region such as the distal region.

There are many possible experiments that could be run to evaluate the relationship between the cure state of the potting compound in a certain region and the process parameters for the translation process itself. An example of one of the many possible experiments may be described as follows:

1. Lock the assembly together as in FIG. 16;
2. Monitor the anchor temperature;
3. At a given anchor temperature, apply tension to the cable;
4. If the cable translates too far and/or translates at a very low tension then the experiment is a failure because the defined transition had not yet occurred and one then knows to wait until a higher viscosity cure state is achieved before applying tension;
5. If the cable undergoes a spike in tension when the force is applied and the filaments appear to be dragging slowly through the potting compound, then limit the translation and allow the potting compound to fully cure (in some cases over a day or more);
6. Measure and record the break strength of the termination; and
7. Possibly examine other cable properties such as filament alignment (by sectioning the cable).

One may then compare the ultimate break strength of the termination against the measured temperature at the time tension was applied. One measured temperature (or range thereof) will produce the best result. This measured temperature then corresponds to the defined transition in the desired region of the cavity and it should be used as the trigger point for applying tension to the cable. Once this measured temperature is found, it will remain the same (or very nearly so) for the same combination of all the factors (potting compound, filaments, anchor type, etc.). However, as one would expect, a new experiment will be needed for each different combination. This not only includes the determining the defined transition point, but also the translation process parameters.

In some instance, some or all of the filaments will be pulled completely free of the distal region so that the free ends of these filaments lie closer to the proximal end of the anchor. In other instances, some or all of the filament ends will remain fixed in the distal region and movement is limited to the region of filaments at the proximal end. Depending on the relative lengths of the filaments within the anchor cavity, in some instances some filaments may not be moved at all.

There is a tendency for the applied translation to pull some of the liquid potting compound out the proximal end of the anchor and introduce a void in the distal and/or extended regions of the cavity. For these instances it may be desirable to introduce additional potting compound (or some other filter material) to fill the void.

The operator preferably understands the relationship between the force applied to the cable, the reactive tension with the cable, and the resulting translation. These may be monitored and automated using a computer system to apply the loads, control velocity, measure the reaction forces, and measure the translation distance. Many different approaches to tension and translation are of course possible, including:
1. Ramping up the tension and allowing continued translation;
2. Ramping up the tension at a certain rate until a certain load value (reactive force) or measured distance (displacement) is achieved;
3. A variable tension or velocity curve and limitation on translation;
4. Varying tension to create a desired translation velocity and amount of total translation; and
5. Ramping up the tension on any of the above configurations in stages, and any combination or addition of steps thereof.

In some cases it may be desirable to monitor the temperature of a specific region within the anchor more precisely in order to determine the defined transition. Multiple temperature sensors may be used at different points of the anchor. One may also use a bore-hole through the side of the anchor so that a temperature sensor can be placed directly adjacent to the curing potting compound. In most cases, however, the temperature rise is fairly gradual and the anchor material is thermally conductive (such as aluminum). In most cases a single temperature for the anchor as a whole will work and the location of the temperature sensor is not overly critical.

The reader should note that the measurement of temperature within the distal region is only exemplary. In some embodiments it may be more important to measure the temperature in the middle region, the neck region, or the transition region. Temperature is really just a proxy for the defined transition (the achievement of a desired potting compound characteristic in a defined region of the anchor), so some experimentation may be needed to determine the best location for the temperature measurement. Assuming consistency is maintained, time itself can be the only parameter that needs to be monitored in order to know when to apply tension.

In general the process of applying tension during the solidification of the potting compound will result in filaments that are aligned and that have been given better load distribution. This improvement in load distribution and filament orientation produces the improved termination performance.

The present invention proposes adding the tension process to the inverted injection process. This combination does produce an issue that is preferably addressed by the hardware. FIG. 18 illustrates this issue. The cable filaments and potting compound are sealed into the anchor cavity in order to create an effective injection process. Air bubbles/cavities tend to migrate toward the top in the view. They are preferably expelled by venting or other means. The distal end of the internal passage ideally contains only liquid potting compound and filaments.

When tension and translation is applied to the cable during the solidification process, pocket 90 tends to form proximate the distal end. The upward translation creates a vacuum and air bubbles may leak into this region. The bubbles may then migrate upward. The formation of such an uncontrolled void is undesirable.

Figure 19:
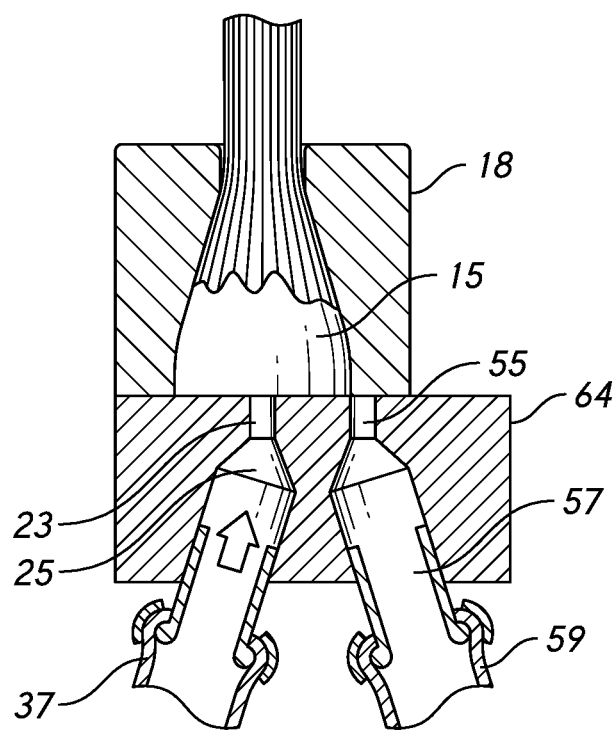
FIG. 19 is a sectional elevation view showing the use of a sealer with two separate injectors.
Figure 20:
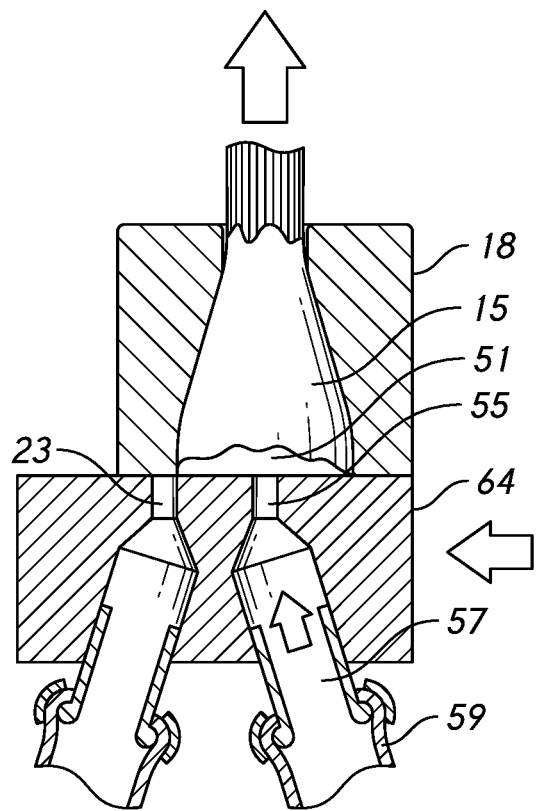
FIG. 20 is a sectional elevation view showing the operation of the device depicted in FIG. 19.

The embodiments shown in FIGS. 19-26 seek to reduce or eliminate the formation of a pocket during the controlled translation process. FIGS. 19-20 show a first approach. In FIG. 19, the reader will observe that sealer 64 includes a pair of openings—first orifice 23 and second orifice 55. When the sealer is in the position shown in FIG. 19, liquid potting compound is fed in through runner 25 and orifice 23. Second orifice 55 is sealed against the distal end of the anchor.

FIG. 20 represents the configuration used for the controlled pulling of the cable. Sealer 64 is shifted to the left. Orifice 23 is thereby shut off by the distal end of the anchor and orifice 55 is opened. While the cable is undergoing controlled translation, auxiliary liquid 51 is fed in through feed line 59, runner 57, and orifice 55. The auxiliary fluid fills the void created by the moving cable. This prevents the unwanted formation of voids. The auxiliary fluid is preferably immiscible with the potting compound. Exemplary materials again include silicone oils and liquid waxes.

Figure 21:
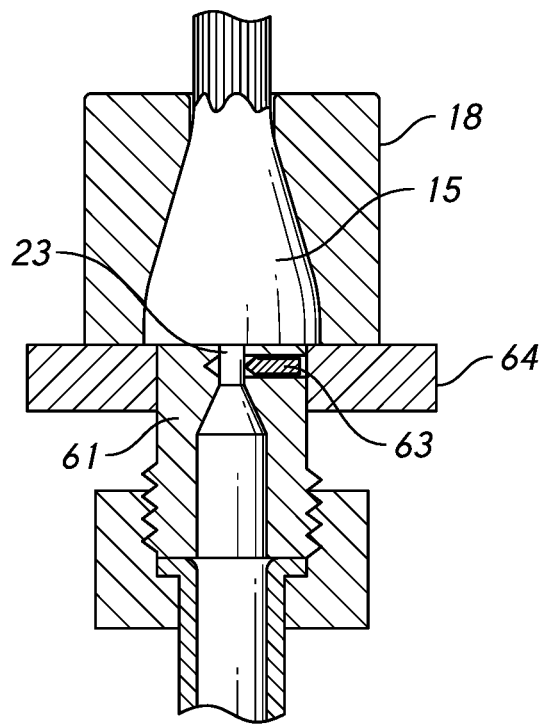
FIG. 21 is a sectional elevation view, showing the use of a sealer with an incorporated piston.
Figure 22:
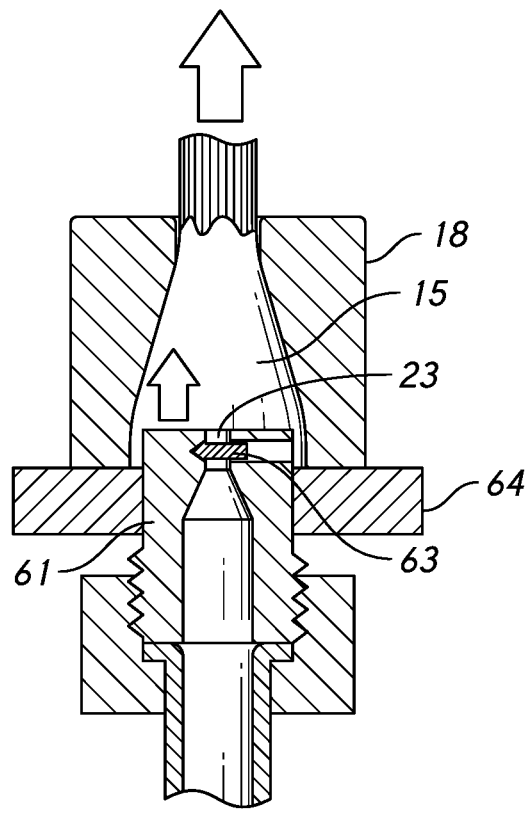
FIG. 22 is a sectional elevation view showing the operation of the components of FIG. 21.

FIGS. 21 and 22 depict a second approach. In FIG. 21, sealer 64 is in position as before. Movable piston 61 occupies the central portion of the sealer. Orifice 23 is located in movable piston 61. In addition, a transverse valve body 63 is provided to selectively close orifice 23. Liquid potting compound 15 is injected through orifice 23 as before.

FIG. 22 shows the same assembly once the controlled pulling (translation) of the cable commences. Valve body 63 is moved laterally to close orifice 23. Piston 61 advances upward to preferably match the amount of translation of the cable. This may be accomplished by applying a modest amount of upward pressure on the piston and just allowing it to move as needed to occupy the space vacated by the cable assembly.

Figure 23:
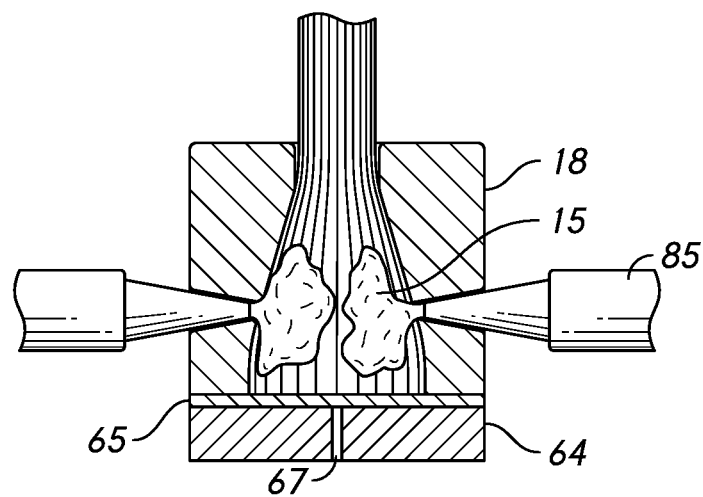
FIG. 23 is a sectional elevation view showing an embodiment including a diaphragm between the sealer and the anchor.
Figure 24:
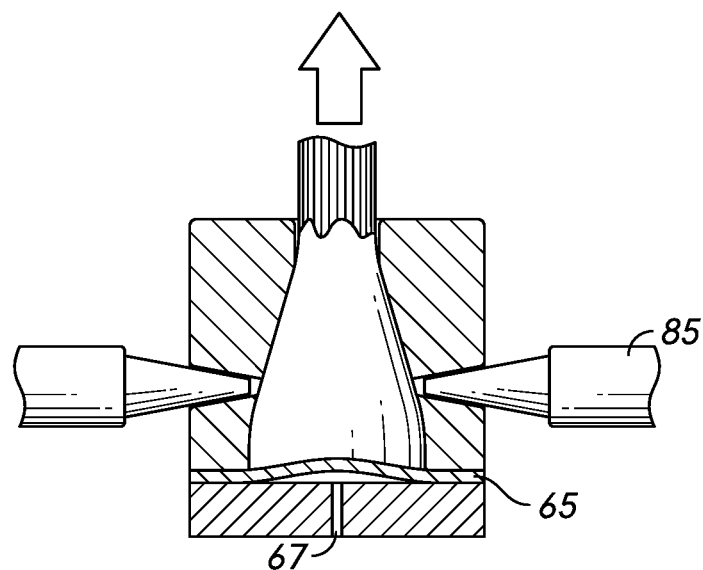
FIG. 24 is a sectional elevation view showing the operation of the components of FIG. 23.

FIGS. 23 and 24 depict a third approach. In FIG. 23, the reader will observe that a flexible diaphragm 65 has been sandwiched between sealer 64 and the distal end of the anchor. Vent 67 opens to the bottom surface of the diaphragm. In this version two injector manifolds 85 are used to inject liquid potting compound through lateral ports in the anchor.

In FIG. 24, controlled translation of the cable has commenced. Diaphragm 65 has deflected upward to fill the void created. Vent 67 allows air to fill in behind the diaphragm as it deflects.

Figure 25:
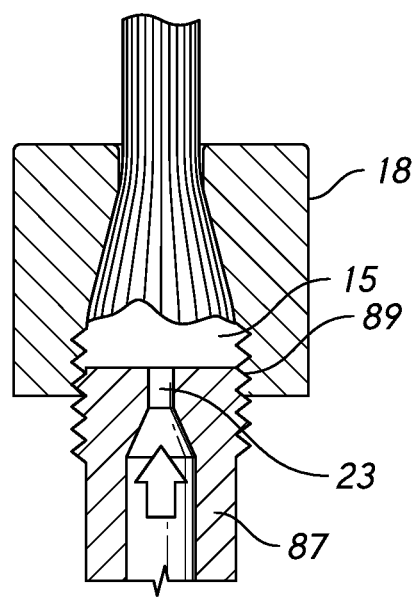
FIG. 25 is a sectional elevation view, showing a sealing device with a threaded engagement.
Figure 26:
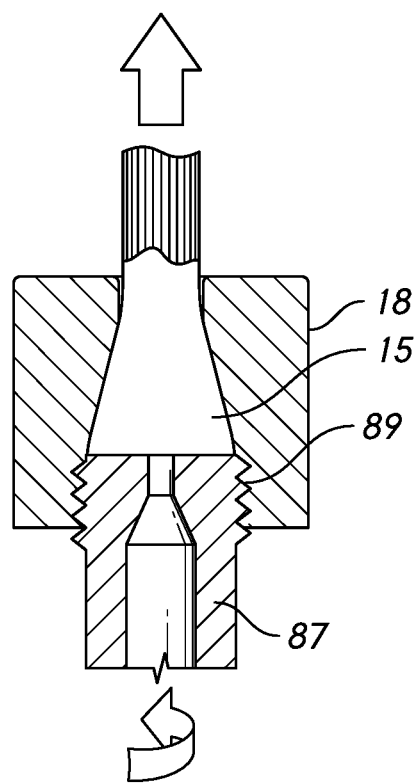
FIG. 26 is a sectional elevation view, showing the operation of the components of FIG. 25.

FIGS. 25 and 26 depict a fourth approach to the issue of void elimination/reduction. In FIG. 25, seal head 87 is substituted as another type of movable piston. Seal head 87 includes a male thread configured to engage a female thread on the distal portion of the passage through anchor 18 (threaded engagement 89). Liquid potting compound 15 is injected through orifice 23 in seal head 87.

FIG. 26 depicts the controlled translation of the cable. Seal head 87 is screwed into the anchor to occupy the volume left vacant by the translation of the cable assembly. It acts as a piston, though the linear motion is actually created by the threaded engagement. Other features—such as a valve body to close the orifice—may be included in the seal head as well.

Figure 27:
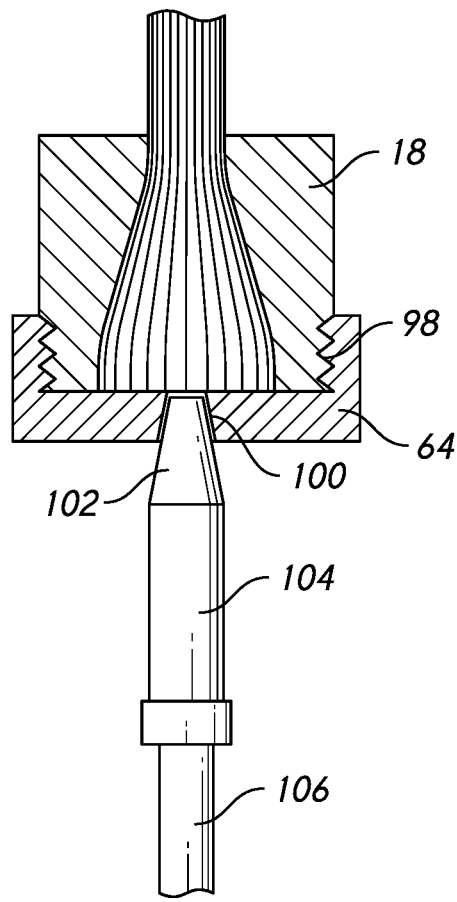
FIG. 27 is a sectional elevation view, showing the use of a disposable injector

Those skilled in the art will know that the potting compounds used to create terminations are often two-part epoxies, and that once the two parts are mixed together the transition to a solid state is irrevocable. For this reason, it is often difficult to clean and reuse the injection hardware. Instead, it may be preferable to employ disposable injection hardware. FIG. 27 shows an embodiment that utilizes a disposable injector and feed line. Anchor 18 is modified with an external thread. Sealer 64 is provided with a corresponding thread so that the sealer may be connected to the anchor using threaded interface 98.

Disposable injector 104 is inserted into tapered orifice 100. It is preferably forced tightly into the orifice so that tapered tip 102 provides a good seal. Liquid potting compound is then applied through hose 106 and through disposable injector 104. The relevant surfaces of sealer 64 may be coated with an appropriate mold release agent to prevent adhesion.

Once the potting compound cures, disposable injector 104 is broken away (by breaking the solidified "sprue" of epoxy lying within tapered orifice 100). Sealer 64 is unscrewed from the anchor. It may be necessary to cut or grind off any remaining piece of epoxy protruding out the distal end of the anchor. In many applications, however, this non-function protrusion can simply be left in place.

In other versions of the embodiment of FIG. 27, sealer 64 may be left in place. The sealer might be injection molded using a fiber-reinforced thermoplastic. Once the injection and curing process is completed, such a sealer could remain part of the completed termination. On the other hand, the sealer could simply be thrown away.

In still another version the sealer might be made of metal and used as a permanent guard over the distal end of the anchor. A strong adhesive could be applied to threaded interface 98 to form a more permanent bond. Tapered orifice 100 will be effectively sealed by the solidified potting compound. Thus, the sealer in this case becomes a permanent sort of protective cap.

Figure 28:
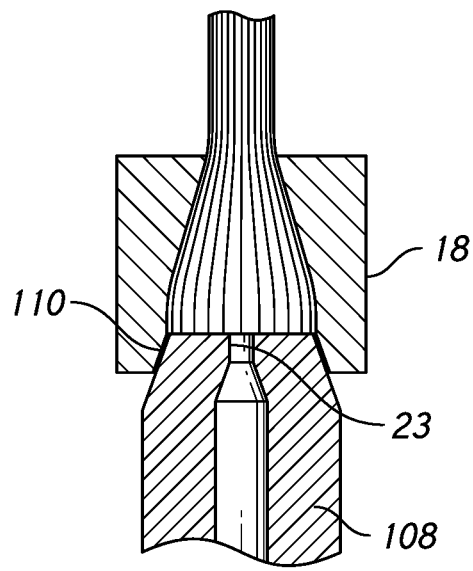
FIG. 28 is a sectional elevation view, showing the use of a piston-type injector with a tapered sealing surface between the injector and a portion of an anchor.

The sealer embodiments disclosed thus far have provided a seal against the anchor's distal end. This is not the only available location for a suitable seal. FIG. 28 discloses another embodiment in which a different type of seal is created. Injection orifice 23 is provided in the middle of movable piston 108.

The upper portion of the piston includes a linearly tapered part. The internal passage in anchor 18 includes a complementary linearly tapered part. Prior to injection piston 108 is forced upward so that tapered seal 110 is created. The injection of liquid potting compound then progresses as described previously.

Any suitable injection pressure may be used—with the suitability depending upon such factors as the viscosity of the liquid potting compound. An injection pressure of several atmospheres may be used for thicker compounds. On the other hand, a gravity-fed system using an elevated tank may be perfectly adequate for thinner compounds.

The components used for sealing and injecting may be part of a large and stationary machine (analogous to a thermoplastic injection molding machine). On the other hand, the components may be small and portable so that a termination could be added to a cable out in the field.

Figure 32:
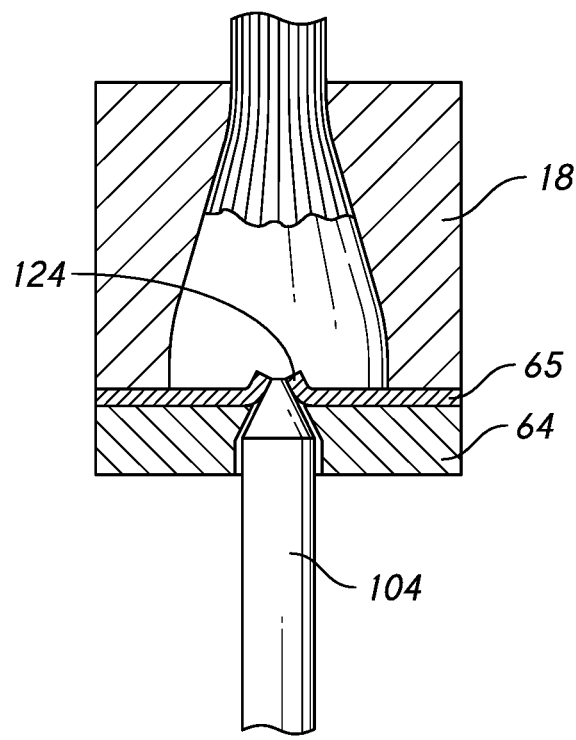
FIG. 32 is a sectional elevation view, showing the use of a disposable injector.

FIG. 32 shows an embodiment in which a diaphragm includes an injection port. Diaphragm 65 is clamped against the distal end of anchor 18 by sealer 64 (as for other embodiments). However, this diaphragm includes an elastically expandable diaphragm port 124. A relief is provided in sealer 64 so that disposable injector 104 (including a tapered tip) may be thrust through diaphragm port 124. Pressurized liquid potting compound is then injected through the diaphragm into the strand cavity. Further, a nozzle for injecting pressurized gas may be substituted for the disposable injector if controlled translation is used during the curing process. The pressurized gas may be injected above the diaphragm to prevent the creation of a vacuum as the strands are pulled upward (and possible rotated) during the controlled translation process.

Many approaches may be used to determine the appropriate time for performing the controlled translation of the cable during the solidification process. The experimental methods described for the embodiments that correlate a measured temperature with the best termination performance may be applied to other measured values as well. As a first additional example, there are devices which measure the dielectric properties of the potting compound as it transitions to a solid state. These measurements may be used to determine the defined initial transition.

As a second additional example, time itself may be correlated to the termination performance. If one has a potting compound and anchor arrangement that allows for a relatively slow cure, and if one carefully controls the conditions (temperature, potting compound mixture ratio etc.) so that they are repeated precisely each time, then the defined transition can occur at the same time in each instance. One may experiment by applying the tension force at various times and correlating the termination performance against the time at which tension was applied. One may experiment by varying other things such as the tension versus time curve, translation limitations, velocity limitations, etc.

As a third additional example one may use an ultra-slow translation process or alternatively stepped micro-translations to determine the time of the defined transition. Once an initial cross-linking has occurred, a controlled tension can be applied and a measuring fixture used to determine the amount of translation resulting from the controlled tension. Increasing viscosity or cure state in a defined region of the cavity can be detected by the reduction in the amount of translation resulting from the application of tension over a limited time. This conclusion would then fix the defined transition.

As a fourth additional example of determining the defined initial transition one may use applied mechanical or electromagnetic waves to the termination assembly and measure the response. This response will change once the potting compound begins its transition to a solid state.

As a fifth additional example, a simple hardness test may be applied to an accessible region of the potting compound. The distal portion of the cavity is often accessible and a force versus penetration probe or other even simpler means may be used to determine hardness. This type of test may be especially useful in configurations such as an open potted socket where the distal region is exposed.

As a sixth additional example, a viscosity test may be applied to an accessible region of the potting compound. A viscosity measuring device (such as a rotating paddle) can be introduced into the potting compound and used to determine when a desired viscosity has been reached.

As a seventh additional example, micro-translations could be applied at staged intervals. For instance, a 0.5 mm translation could be applied once every 10 minutes.

As an eighth additional example, one could apply variable tension needed to achieve a desired translation velocity. This application would then cease after a desired translation had been achieved.

The use of controlled rotation in addition to controlled translation may be beneficial for some cable constructions, such as a cable having a helical winding. Such a cable has a central axis, but the helically wound filaments are at no point parallel to that axis. They are instead offset by a distance and a helix angle. Such cables are often potted with the filaments lying in an orientation within the anchor cavity that is generally parallel to the cable axis. This fact introduces a bend as the filaments exit the anchor and a resulting stress riser at the point of the bend. In order to reduce this bending transition, the cable may be rotated during the potting process. Preferably this rotation is applied in combination with the application of tension.

One could also inject catalyzing agents to selectively increase the viscosity or cure state in one region versus another. As an example, a needle can be placed within a portion of the cavity and used to inject additional catalyst into a two-part epoxy so that the viscosity in that region would rise more rapidly.

One could also add other materials to affect heat generation and transfer. If, for instance, one part of the anchor is surrounded by a material having reduced thermal conductivity while another is not, an enhanced temperature difference may be created.

The invention capitalizes on the fact that the potting compound in the cavity tends to transition to a solid more quickly in the distal region than in the neck region. In many embodiments the appropriate difference in cure rate will occur naturally and the proper application of the invention depends mostly on determining when the defined transition in the defined region occurs. However, in other cases it may be necessary to force a desired temperature or cure-rate difference. This can be created by the application of heating, cooling or both. As an example, a heating jacket could be placed around the distal region of the anchor itself while a cooling jacking is placed around the neck region. Passages for a circulating heating or cooling liquid could also be provided in the anchor itself. It is also possible to provide a potting compound with different mix ratios so that one portion cures faster than the other even under identical conditions.

Those skilled in the art will know that differing cure rates can be produced in some potting compounds by the introduction of UV light, ultrasonic vibration, and certain gases. The invention is by no means limited to temperature-induced differences.

Additional variations on the invention thus described include the following:
1. All the vacuum chambers shown could just be referred to as "chambers" where no pressure or vacuum is applied. These chambers can then be used to control the temperature of the termination assembly during some or all of the process of adding a termination.
2. A single chamber can be used to house multiple terminations. For instance, a single chamber might house four anchors being added to the ends of four cables. Separate monitoring and tension-applying fixtures may optionally be added for each termination. Carrying this concept to its logical conclusion—a temperature controlled room may be used as a single large chamber for dozens of anchors.
3. A combination of heating and cooling may be applied. As an example, it is sometimes advantageous to heat the liquid potting compound prior to injection in order to reduce its viscosity. If heated resin is used it is often desirable to actually cool the anchor so that the cross-linking reaction does not occur too rapidly. The anchor and cable are placed in a chamber that lowers the temperature of both prior to the injection process and optionally continues to remove heat during the curing phase.
4. In other cases it can be desirable to cool the resin prior to injection in order to slow the reaction rate. The ability to control the temperature of the resin and the temperature of the anchor/cable allows many refinements.
5. In some instances positive pressure will be applied to the chamber while even greater positive pressure is being used to infuse the resin. The positive chamber pressure tends to reduce air voids.
6. If a temperature chamber is used for multiple anchors/cables, this does not mean that every anchor/cable must be at the same point of the process. Each can still be injected individually and cured individually. The processes employed are fairly slow (often requiring many hours for cure). As long as the multiple assemblies are close enough in time to use the same environmental conditions (such as temperature) they can still be run in the same chamber.

The preceding examples have illustrated the attachment of a single anchor to an end of a cable (or a strand of a larger cable). As those skilled in the art will know, larger cables may be terminated by affixing an anchor to the end of each strand and then attaching the plurality of anchors to another device. FIGS. 33-36 illustrate an inventive embodiment suitable for this purpose.

Figure 33:
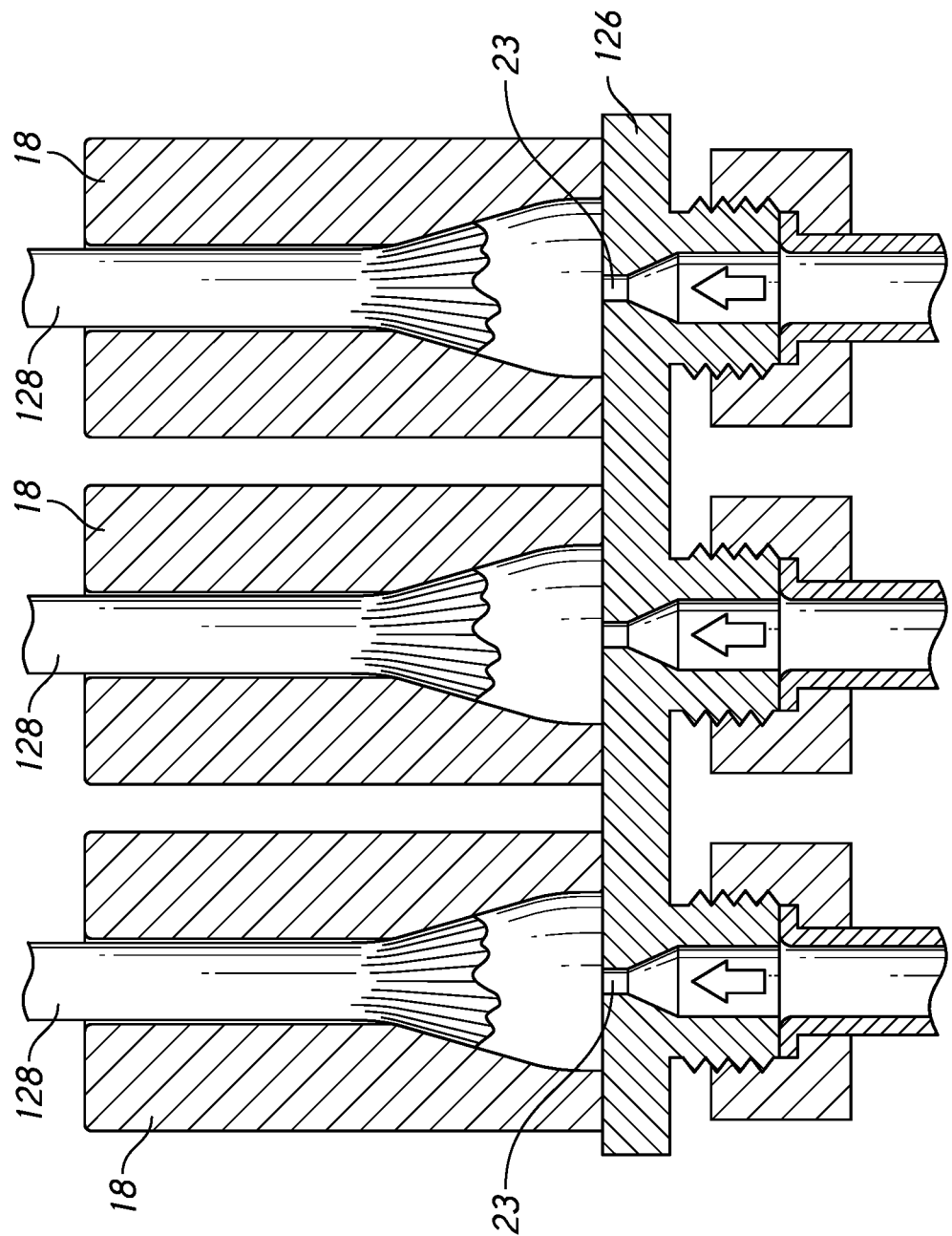
FIG. 33 is a section elevation view, showing the use of a multi-port sealer.

FIG. 33 provides a sectional elevation view of an inverted injection apparatus configured to simultaneously inject multiple cavities in multiple anchors (or possibly multiple cavities in a single, larger anchor). Multi-port sealer 126 is clamped against the distal end of multiple anchors 18. Each anchor contains a strand 128—with the end of the strand being placed in a cavity within the anchor. An injection orifice 23 is provided for each anchor. Liquid potting compound is injected through each orifice as shown. The liquid potting compound transitions into a solid and locks the strand to the anchor, as explained previously.

Figure 34:
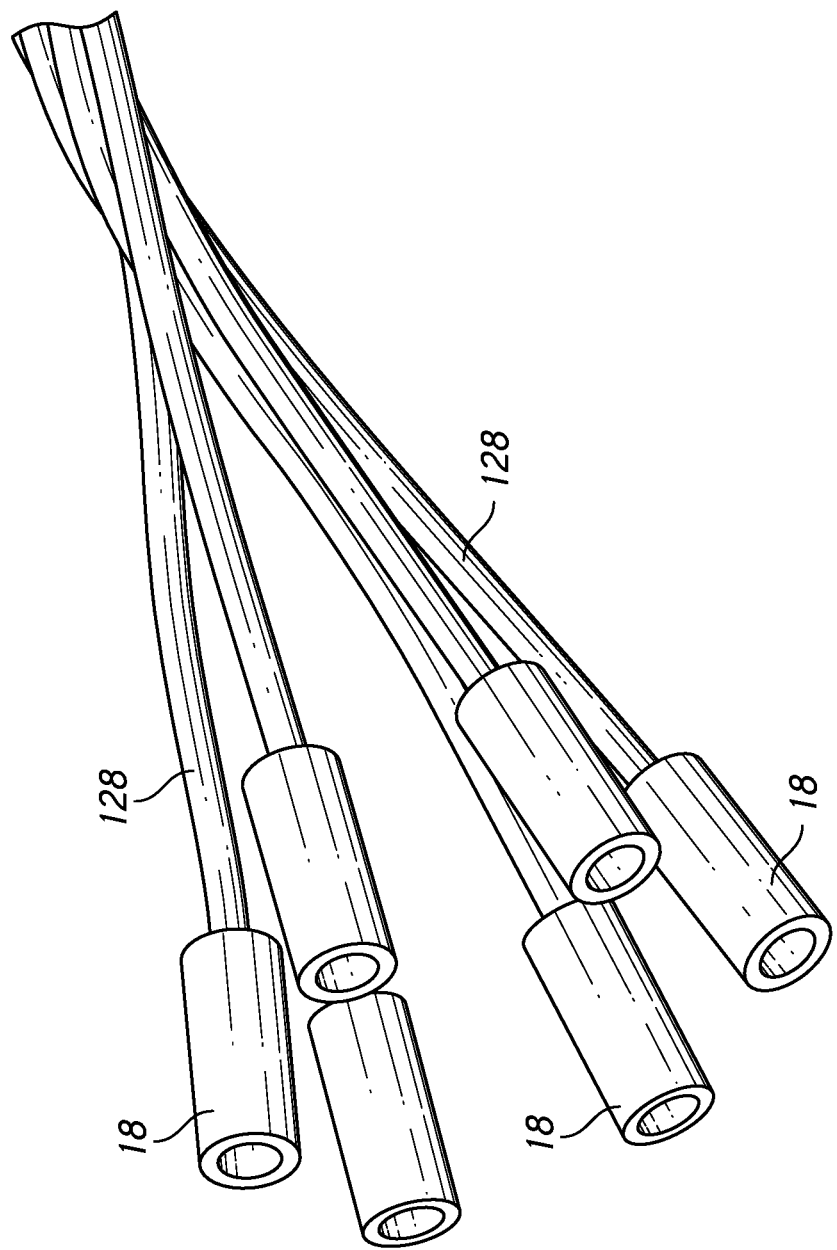
FIG. 34 is a perspective view, showing the application of multiple anchors to a multi-stranded cable.
Figure 35:
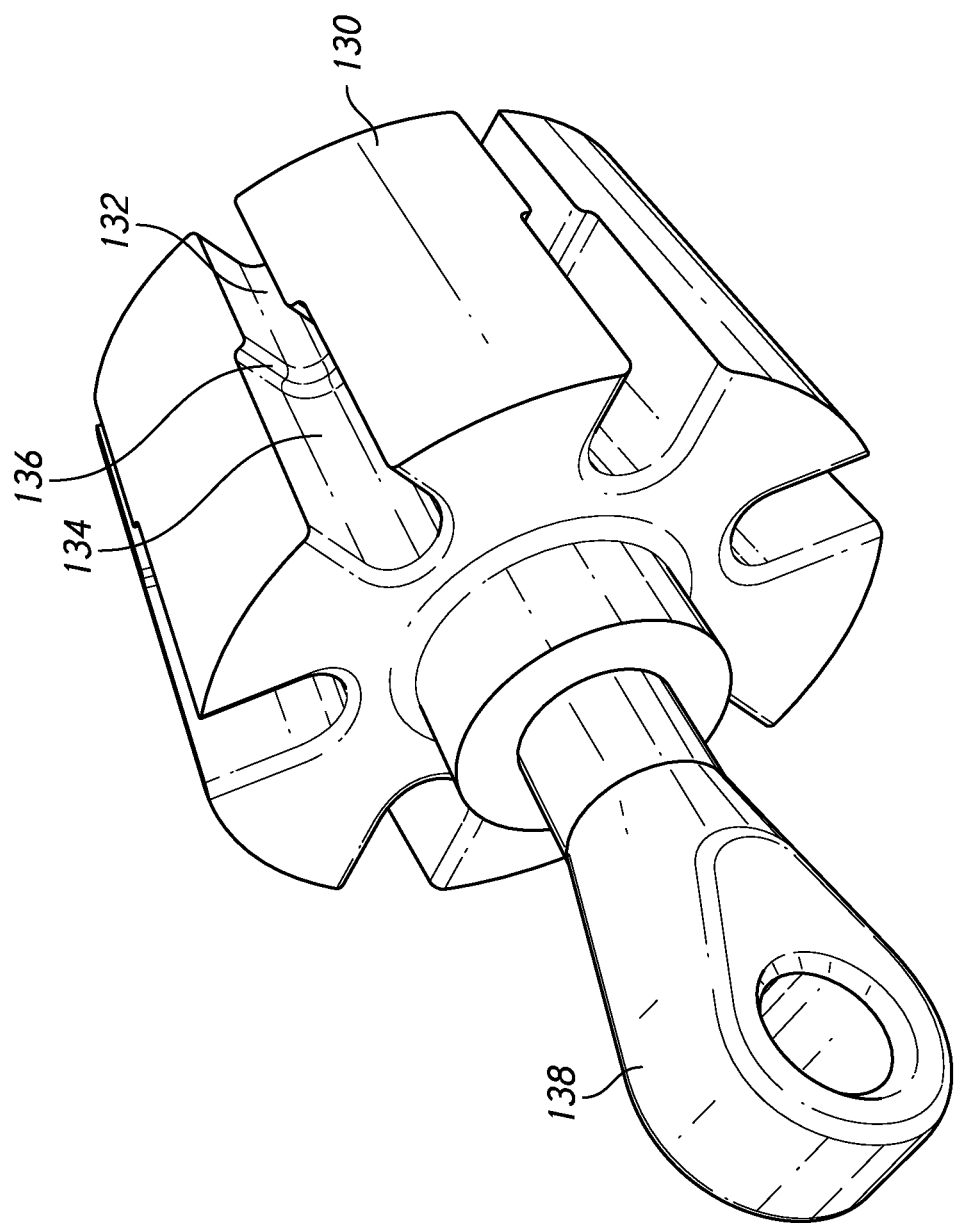
FIG. 35 is a perspective view, showing a collector configured for use with the assembly of FIG. 34.
Figure 36:
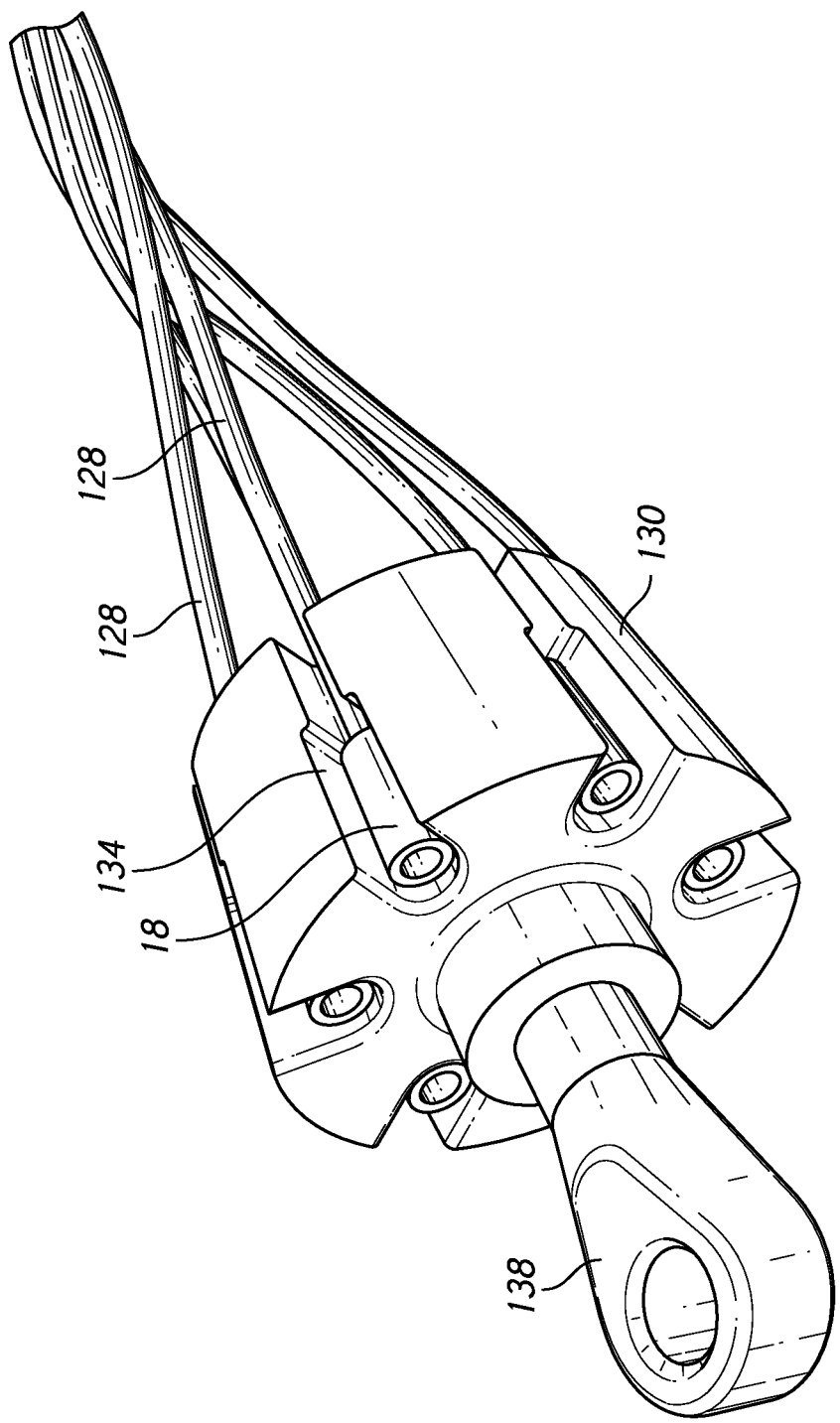
FIG. 36 is a perspective view, showing the assembly of the collector with the multi-stranded cable.

FIG. 34 shows the result. An anchor 18 has been affixed to the ends of the six strands 128 making up a larger cable. FIG. 35 illustrates a collector 130 that is configured to receive and hold the strands. The collector includes six separate anchor pockets 134. Each such anchor pocket includes a strand channel 132 and a shoulder 136. The strand channel is too small to allow the passage of the anchor. Thus, the anchor transmits the tensile load of its attached strand to shoulder 136 and thence to collector 130.

FIG. 136 shows the assembly of the terminated strands to the collector. The reader will note how each anchor 18 rests within a corresponding anchor pocket 134. The collector preferably includes an attachment feature 138 for transmitting loads from the cable to an external component. In the embodiment shown, the attachment feature is a loading eye. Other examples include a hook, a flange, an external thread, and an internally-threaded passage. In the assembly shown a load placed on the cable tends to ensure that each anchor remains within its anchor pocket. Additional securing devices may be used as well.

Although the preceding description contains significant detail, it should not be construed as limiting the scope of the invention but rather as providing illustrations of the preferred embodiments of the invention. Those skilled in the art will be able to devise many other embodiments that carry out the present invention. Thus, the language used in the claims shall define the invention rather than the specific embodiments provided.

Having described our invention, we claim:

1. A method for adding a termination to an end of a tensile strength member including multiple synthetic filaments, comprising:
   (a) providing an anchor with a proximal end, a distal end, and a cavity;
   (b) said cavity including a distal region and a neck region;
   (c) providing a potting compound in a liquid state, said potting compound being configured to transition to a solid state over time;

(d) placing a length of said filaments within said cavity;
(e) placing said anchor and said length of filaments in an inverted position whereby said proximal end of said anchor lies above said distal end of said anchor, with said tensile strength member extending upward out of said proximal end;
(f) sealing said distal region of said cavity;
(g) injecting said potting compound in said liquid state into said distal region of said cavity;
(h) applying a vacuum to said cavity; and
(i) maintaining said anchor and said length of filaments in said inverted position until said liquid potting compound has transitioned substantially to a solid.

2. The method for adding a termination to an end of a tensile strength member as recited in claim 1, wherein:
(a) said distal end of said anchor is open;
(b) said distal end of said anchor is sealed by a sealer; and
(c) said sealer includes an orifice configured to inject said liquid potting compound.

3. The method for adding a termination to an end of a tensile strength member as recited in claim 1, wherein said vacuum is added to said cavity by placing said anchor in a vacuum bag and applying said vacuum to said vacuum bag.

4. The method for adding a termination to an end of a tensile strength member as recited in claim 1, wherein said vacuum is added to said cavity by placing said anchor in a vacuum chamber and applying said vacuum to said vacuum chamber.

5. The method for adding a termination to an end of a tensile strength member as recited in claim 4, further comprising:
(a) wherein said tensile strength member has a second end distal to said anchor and An impermeable jacket, and
(b) placing said second end of said tensile strength member in a second vacuum chamber; and
(c) applying a vacuum to said second vacuum chamber.

6. The method for adding a termination to an end of a tensile strength member as recited in claim 1, wherein:
(a) said distal end of said anchor is open;
(b) said distal region of said cavity is sealed by placing said sealer against said distal end of said anchor; and
(c) said liquid potting compound is injected through a port in said anchor.

7. The method for adding a termination to an end of a tensile strength member as recited in claim 1, further comprising:
(a) wherein said tensile strength member includes multiple strands, with a first strand being locked by said potting compound into said cavity in said anchor;
(b) providing a second anchor with a proximal end, a distal end, and a second cavity;
(c) said second cavity including a distal region and a neck region;
(d) placing a second length of said filaments from a second strand into said second cavity;
(e) placing said second anchor and said second length of filaments in an inverted position whereby said proximal end of said second anchor lies above said distal end of said second anchor, with said second strand extending upward out of said proximal end;
(f) sealing said distal region of said second cavity;
(g) injecting said potting compound in said liquid state into said distal region of said second cavity;
(h) applying a vacuum to said second cavity;
(i) maintaining said second anchor and said second length of filaments in said inverted position until said liquid potting compound has transitioned substantially to a solid;
(j) providing a collector; and
(k) attaching said first and second anchor to said collector.

8. A method for adding a termination to an end of a tensile strength member including multiple synthetic filaments, comprising:
(a) providing an anchor with a proximal end, a distal end, and a cavity;
(b) said cavity including a distal region and a neck region;
(c) providing a potting compound in a liquid state, said potting compound being configured to transition to a solid state over time;
(d) placing a length of said filaments within said cavity;
(e) placing said anchor and said length of filaments in an inverted position whereby said proximal end of said anchor lies above said distal end of said anchor, with said tensile strength member extending upward out of said proximal end;
(f) sealing said distal region of said cavity;
(g) forcing said potting compound in said liquid state into said cavity;
(h) applying a vacuum to said cavity; and
(i) maintaining said anchor and said length of filaments in said inverted position until said liquid potting compound has transitioned substantially to a solid.

9. The method for adding a termination to an end of a tensile strength member as recited in claim 8, wherein:
(a) said distal end of said anchor is open;
(b) said distal end of said anchor is sealed by a sealer; and
(c) said sealer includes an orifice configured to inject said liquid potting compound.

10. The method for adding a termination to an end of a tensile strength member as recited in claim 8, wherein applying said vacuum comprises placing said anchor in a vacuum bag and applying said vacuum to said vacuum bag.

11. The method for adding a termination to an end of a tensile strength member as recited in claim 8, wherein applying said vacuum comprises placing said anchor in a vacuum chamber and applying said vacuum to said vacuum chamber.

12. The method for adding a termination to an end of a tensile strength member as recited in claim 11, further comprising:
(a) wherein said tensile strength member has a second end distal to said anchor and an impermeable jacket; and
(b) placing said second end of said tensile strength member in a second vacuum chamber; and
(c) applying a vacuum to said second vacuum chamber.

13. The method for adding a termination to an end of a tensile strength member as recited in claim 8, wherein:
(a) said distal end of said anchor is open;
(b) said distal region of said cavity is sealed by placing said sealer against said distal end of said anchor; and
(c) said liquid potting compound is injected through a port in said anchor.

14. The method for adding a termination to an end of a tensile strength member as recited in claim 8, further comprising:
(a) wherein said tensile strength member includes multiple strands, with a first strand being locked by said potting compound into said cavity in said anchor;
(b) providing a second anchor with a proximal end, a distal end, and a second cavity;

(c) said second cavity including a distal region and a neck region;
(d) placing a second length of said filaments from a second strand into said second cavity;
(e) placing said second anchor and said second length of filaments in an inverted position whereby said proximal end of said second anchor lies above said distal end of said second anchor, with said second strand extending upward out of said proximal end;
(f) sealing said distal region of said second cavity;
(g) injecting said potting compound in said liquid state into said distal region of said second cavity;
(h) maintaining said second anchor and said second length of filaments in said inverted position until said liquid potting compound has transitioned substantially to a solid;
(i) providing a collector; and
(j) attaching said first and second anchor to said collector.

15. A method for adding a termination to an end of a tensile strength member including multiple synthetic filaments, comprising:
(a) providing an anchor with a proximal end, a distal end, and a cavity;
(b) said cavity including a distal region and a neck region;
(c) providing a potting compound in a liquid state, said potting compound being configured to transition to a solid state over time;
(d) placing a length of said filaments within said cavity;
(e) placing said anchor and said length of filaments in an inverted position whereby said proximal end of said anchor lies above said distal end of said anchor, with said tensile strength member extending upward out of said proximal end;
(f) sealing said distal region of said cavity;
(g) injecting said potting compound in said liquid state into said cavity;
(h) applying a vacuum to said cavity; and
(i) maintaining said anchor and said length of filaments in said inverted position until said liquid potting compound has transitioned substantially to a solid.

16. The method for adding a termination to an end of a tensile strength member as recited in claim 15, wherein:
(a) said distal end of said anchor is open;
(b) said distal end of said anchor is sealed by a sealer; and
(c) said sealer includes an orifice configured to inject said liquid potting compound.

17. The method for adding a termination to an end of a tensile strength member as recited in claim 15, wherein applying said vacuum comprises placing said anchor in a vacuum bag and applying said vacuum to said vacuum bag.

18. The method for adding a termination to an end of a tensile strength member as recited in claim 15, wherein applying said vacuum comprises placing said anchor in a vacuum chamber and applying said vacuum to said vacuum chamber.

19. The method for adding a termination to an end of a tensile strength member as recited in claim 18, further comprising:
(a) wherein said tensile strength member has a second end distal to said anchor and An impermeable jacket; and
(b) placing said second end of said tensile strength member in a second vacuum chamber; and
(c) applying a vacuum to said second vacuum chamber.

20. The method for adding a termination to an end of a tensile strength member as recited in claim 15, wherein:
(a) a said distal end of said anchor is open;
(b) said distal region of said cavity is sealed by placing said sealer against said distal end of said anchor; and
(c) said liquid potting compound is injected through a port in said anchor.

\* \* \* \* \*